United States Patent [19]
Whitney et al.

[11] 3,761,792
[45] Sept. 25, 1973

[54] SWITCHING CIRCUIT FOR MOTOR START WINDING

[75] Inventors: John A. Whitney, Ft. Wayne; Richard E. Woods, Markle; William H. Hohman, Bluffton, all of Ind.

[73] Assignee: Franklin Electric Co. Inc., Bluffton, Ind.

[22] Filed: Feb. 7, 1972

[21] Appl. No.: 223,865

Related U.S. Application Data

[63] Continuation-in-part of Ser. No. 72,675, Sept. 16, 1970, abandoned.

[52] U.S. Cl. .............................. 318/221 E, 318/227
[51] Int. Cl. ............................................. H02p 1/44
[58] Field of Search ................... 318/221 E, 221 R, 318/227

[56] References Cited
UNITED STATES PATENTS

| | | | |
|---|---|---|---|
| 3,530,348 | 9/1970 | Conner | 318/221 E |
| 3,421,064 | 1/1969 | Phillips | 318/221 R |
| 3,671,830 | 6/1972 | Kruper | 318/221 E |
| 3,489,969 | 1/1970 | Knauer et al. | 318/221 R |

Primary Examiner—Gene Z. Rubinson
Attorney—Axel A. Hofgren et al.

[57] ABSTRACT

In an AC motor having a main winding and a start winding, a thyristor in series with the start winding uncouples the start winding from an AC power source when the motor reaches a preselected cut-out speed, and recouples the start winding to the AC power source when the motor speed is reduced to a preselected cut-in speed. Various electrical characteristics are utilized to control start winding power removal and reapplication. One embodiment utilizes the change with motor speed of the phase difference of the current through the start winding relative to the applied voltage. Another embodiment utilizes the change with motor speed of the phase difference between the voltage of the start winding or start capacitor versus applied voltage. Finally, an embodiment utilizes the change with motor speed of the magnitude of the voltage induced across the start winding relative to the magnitude of applied voltage.

45 Claims, 27 Drawing Figures

INVENTORS
John A. Whitney
Richard E. Woods
William H. Hohman
BY Hofgren, Wegner, Allen, Stellman & McCord
ATTORNEYS

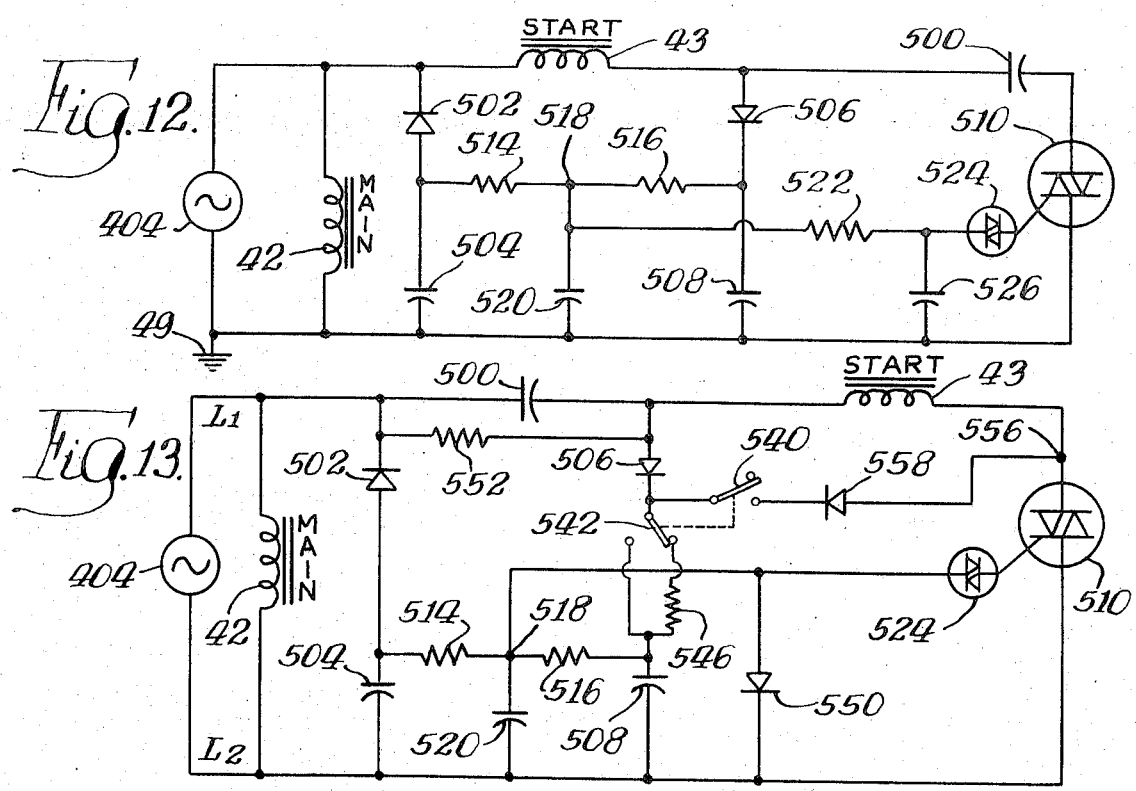
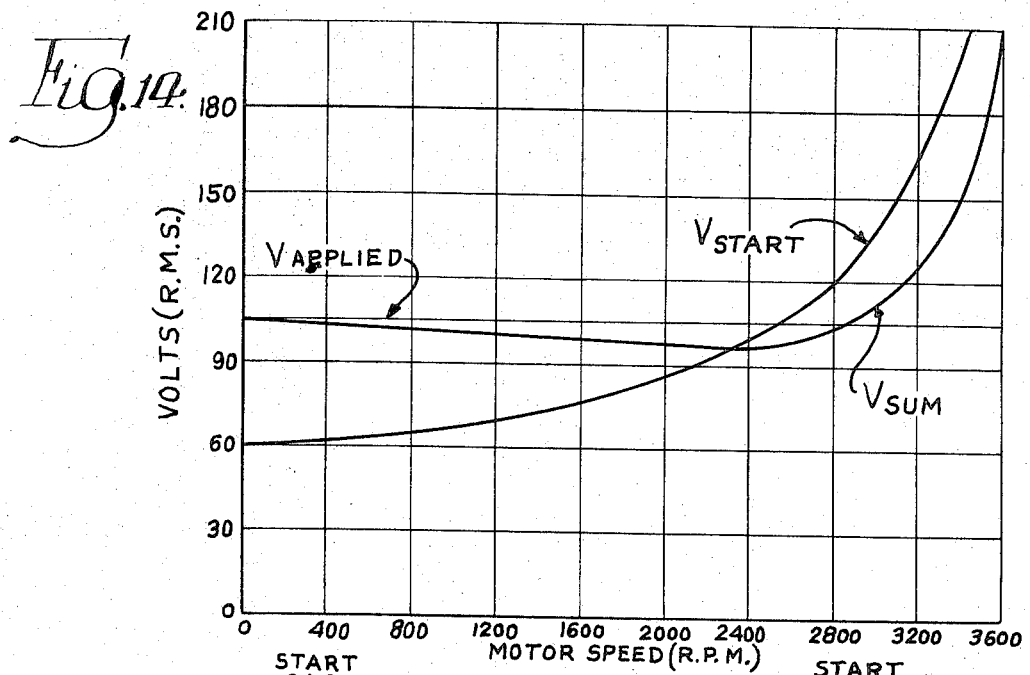
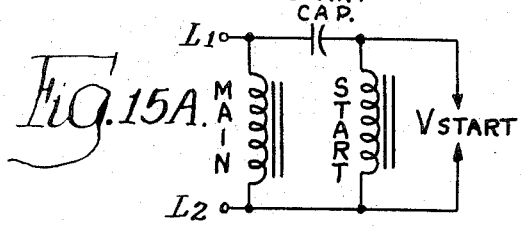 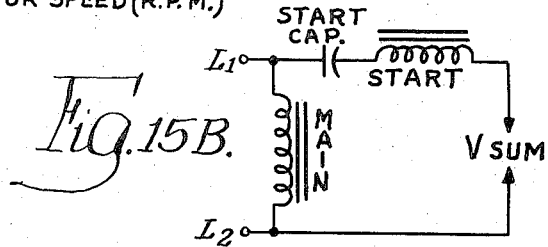

SWITCHING CIRCUIT FOR MOTOR START WINDING

CROSS-REFERENCE TO RELATED APPLICATION

This application is a continuation-in-part of our pending application Ser. No. 72,675, filed Sept. 16, 1970 now abandoned, entitled "Switching Circuit For Motor Start Winding," and assigned to the same assignee as the present application.

BACKGROUND OF THE INVENTION

This invention relates to AC motor start winding switches, and in particular to an electronic switch which is responsive to motor speed.

Many AC motors have a start winding which provides torque during the interval from initial application of power until the motor approaches synchronous speed. Once operating speed is reached, however, the torque supplied by the start winding is no longer needed, and the most efficient operation of the motor necessitates the removal of power from the start winding.

It is known to mount a mechanical centrifugal switch on the rotor which upon reaching the desired speed opens the start winding circuit. This approach, however, has several disadvantages. First, there is the inherent disadvantage of using a mechanical switch having contacts which may become corroded and worn, springs which may become fatigued, and other moving parts which necessitate continual adjustment due to normal wear and tear. Furthermore, if no means are provided to prevent the switch contacts from subsequently closing after initially opening, power will be reapplied to the start winding at approximately the same speed at which it is removed, which may not be desirable. Finally, if means are provided to prevent the switch contacts from closing after initially opening, the switch contacts would have to be preset prior to each motor start operation, and power could not be reapplied to the start winding automatically in response to decreasing motor speed caused by increased motor load, which is often desirable.

Another approach to the problem of start winding power removal has been to open the start winding switch a fixed time after application of power. The difficulty encountered using this approach is that if the motor is started under load, it will take a longer time to reach operating speed, and power will be removed from the start winding when it is still needed. Also, this approach does not provide for reapplication of power to the start winding if motor speed is reduced.

It has also been proposed to use a current or potential sensitive relay to sense the current through or voltage across the start winding to control the start winding switch. However, the relationship of motor speed to the amplitude of either current or voltage is dependent on applied or line voltage. Unless the source is well regulated, switching speeds will vary widely with changes in line voltage.

SUMMARY OF THE INVENTION

The improved motor start winding switch of the present invention overcomes the disadvantages of the switches noted above in a novel manner. The switches disclosed herein monitor one or more speed dependent electrical characteristics of the motor and actuate a switch coupling the start winding to the power source.

One embodiment of the start winding switch utilizes the characteristic of the motor that the phase difference between the current through the start winding and the applied voltage changes with motor speed. A bidirectional triode thyristor in series with the start winding is gated on by a trigger signal until the power removal cut-out speed is reached. The trigger signal is generated during preselected phase angles of the applied voltage and occurs during the periodic zero crossings of the start winding current until, and only until, the relative phase between the start winding current and the applied voltage reaches a preselected value corresponding to a cut-out speed. The thyristor turns off at each zero crossing for the subsequent half cycle if the trigger signal is not being simultaneously generated at the time of zero crossing or shortly thereafter. Each time the thyristor is off, i.e., a current zero point, the sum of the applied voltage and a voltage induced across the start winding is developed, and when cut-out speed is exceeded, the developed sum voltage disables the trigger signal generator to prevent the thyristor from subsequently turning on.

Another electrical characteristic of the motor is that the phase of the aforementioned voltage sum relative to the applied voltage varies with motor speed. This characteristic is sensed, by unique circuits which overcome the problem of the shunt effect of the thyristor when conducting, in order to control power application to the start winding. A further circuit utilizes this characteristic to enable the trigger signal generating means to reapply power to the start winding in response to the voltage phase assuming a preselected value corresponding to a motor cut-in speed. Such capability is often desirable where an increased motor load causes a reduction in speed requiring an increased torque.

In another embodiment the start winding switch operation is based on the voltage induced across the start winding which is approximately proportional to both the motor speed and the applied power voltage. A first scalar signal having a magnitude directly proportional to the absolute magnitude of the power source voltage, and a second scalar signal having a magnitude directly proportional to the absolute magnitude of the induced voltage are produced. The arithmetic difference between these two scalar signals is directly proportional to motor speed and relatively linear over the range of speeds of interest, and further is essentially independent of line voltage variations. This difference controls a thyristor in series with the start winding.

Thus, an important feature of this invention is the provision of an electronic start winding switch responsive to the relative phase of start winding current and/or voltage to control power to the start winding.

Another feature of the invention is that the switch is responsive to a speed dependent electrical characteristic of the motor which is utilized so as to provide thyristor control independent of line voltage variations.

A further feature is that the switch, can if desired, have a lock-out condition after the motor achieves a desired speed.

Still another feature is that the switch is operative to reapply power to the start winding if the motor slows down, by in some embodiments sensing the same motor characteristic as initially caused power to be applied, or in other embodiments by sensing a different motor characteristic.

And another feature is that a switch operation is based on a scalar relationship between the amplitude of the voltage induced in the start winding relative to the line voltage.

Still a further feature is the provision of a phase shift circuit in the start winding control for a capacitor start motor.

Further features and advantages of the invention will be apparent from the following description taken in connection with the accompanying drawings.

BRIEF DESCRIPTION OF THE DRAWINGS

FIG. 4 is a representative waveform showing the relative phase of the applied voltage, the start winding current and the trigger signal at cut-out speed of the switch of FIG. 3;

FIG. 12 is a circuit schematic of a further embodiment of the scalar responsive motor start winding switch;

FIG. 13 is a circuit schematic of yet another embodiment of the scalar responsive motor start winding switch;

FIG. 14 is a plot of voltage magnitude as a function of motor speed for the circuit shown in FIG. 13;

FIGS. 15a and 15b are equivalent diagrams of a portion of the circuit of FIG. 13 and concerning the voltages shown in FIG. 14;

DESCRIPTION OF THE INVENTION

Figure 1:
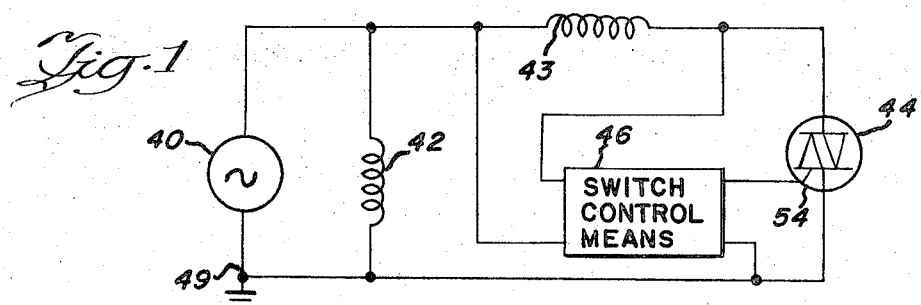
FIG. 1 is a circuit schematic of a motor having a main winding and a start winding and showing a start winding power switch and a phase responsive switch control in block form.

A phase responsive motor start winding switch is shown in FIG. 1 wherein alternating power source 40 is connected directly with main motor winding 42 and to start winding 43 through switch means, here a bidirectional triode thyristor 44, as for example the switch sold by General Electric under the trademark Triac. A switch control means 46 is connected across start winding 43 and across source 40. One terminal of source 40 is preferably connected with a reference potential or ground 49. The output of the control is connected with Triac gate 54.

Figure 2A:
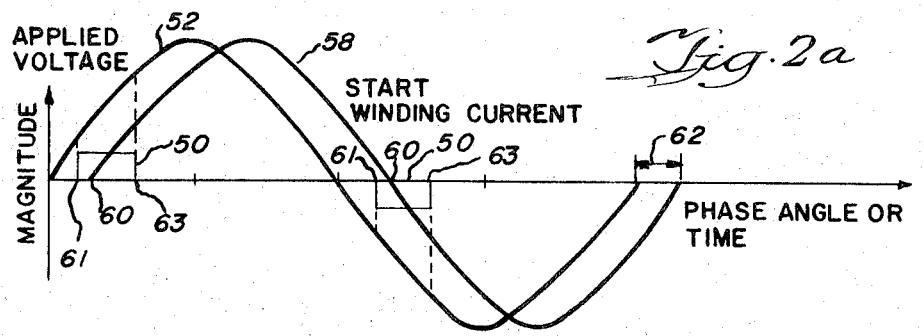
FIG. 2a is a representative waveform showing the relative phase of the start winding current, the voltage and the switch trigger signal at a motor speed less than a cut-out speed.
Figure 2B:
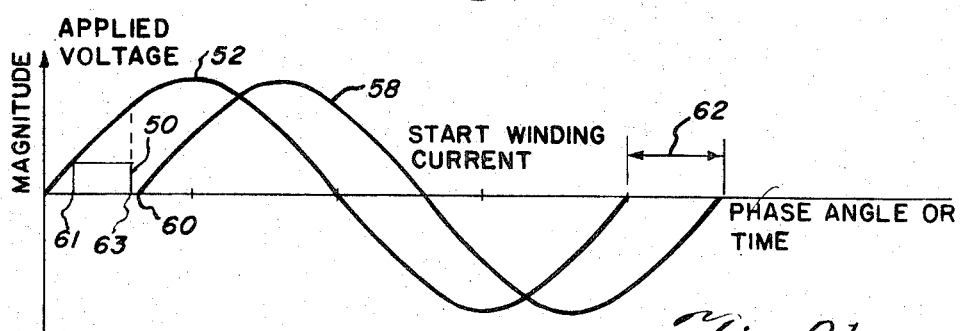
FIG. 2b is a representative waveform similar to that of FIG. 2a, showing the relative phase of the various signals at cut-out speed.

Switch control means 46 generates a trigger signal 50, shown in FIGS. 2a and 2b, during preselected phase angles of applied voltage 52, which is coupled to gate input 54 of Triac 44 to control the application of power to the start winding. Triac 44 turns on in response to trigger signal 50 applied to gate input 54 and turns off when the start winding current 58 falls below a minimum holding current value, i.e., when the current passes through zero at cross-over point 60.

Control means 46 starts generating trigger signal 50 in response to source voltage 52 reaching phase angle 61 and stops generating the trigger signal when the voltage reaches phase angle 63. As shown in FIG. 2a at a motor speed below cut-out speed, the relative phase difference 62 is such that the current cross-over point 60 of start winding current 58 occurs after the applied voltage 52 assumes phase angle 61 and before applied voltage 52 assumes phase angle 63. Thus, at speeds below cut-out speed, trigger signal 50 will be generated simultaneously with the zero cross-over point 60 of the start winding current. Triac 44 ceases conduction as the current goes to zero and as it is retriggered it reverses.

The trigger signal 50 may comprise either a burst of short duration pulses or a single broad pulse as shown in FIGS. 2a and 2b. If trigger signal 50 comprises a burst of short duration pulses, any one of the pulses will turn on Triac 44 after the occurrence of current crossover.

Figure 2C:
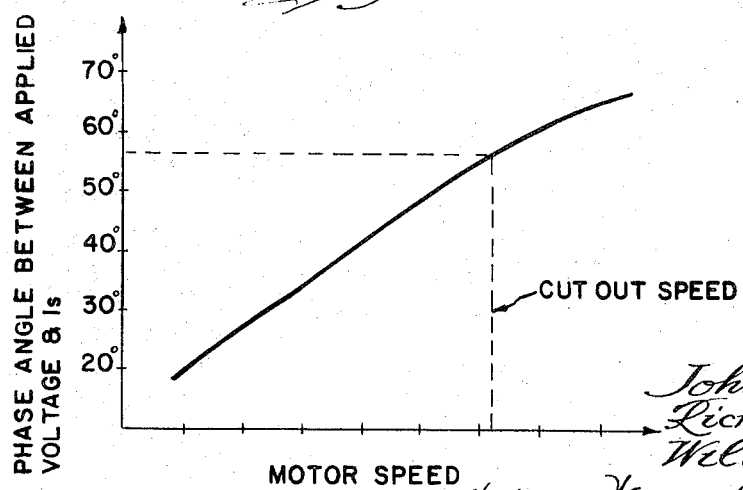
FIG. 2c is a plot of phase angle between applied voltage and start winding current as a function of motor speed.
Figure 2:
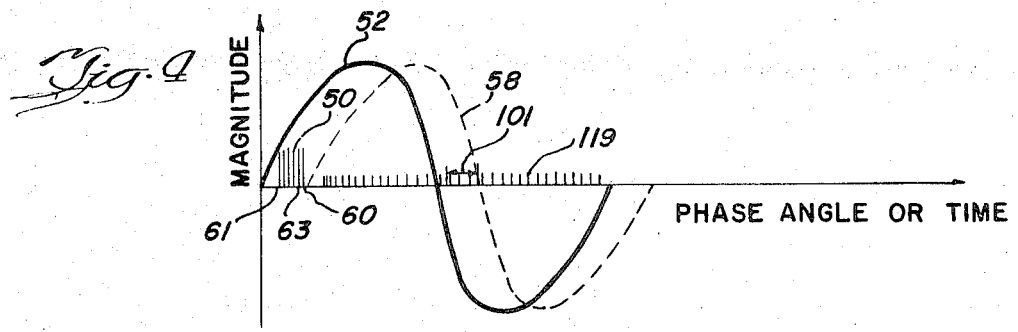

Relative phase angle 62 between the applied voltage and the start winding current $I_S$ increases with motor speed, as shown in the plot of FIG. 2c. When the phase angle reaches a value corresponding to a preselected cut-out speed, as shown in FIG. 2c, start winding current 58 does not reach the cross-over point 60 until after trigger signal 50 is ended. Triac 44 does not turn on, and start winding 43 is effectively out of the circuit.

Figure 3:
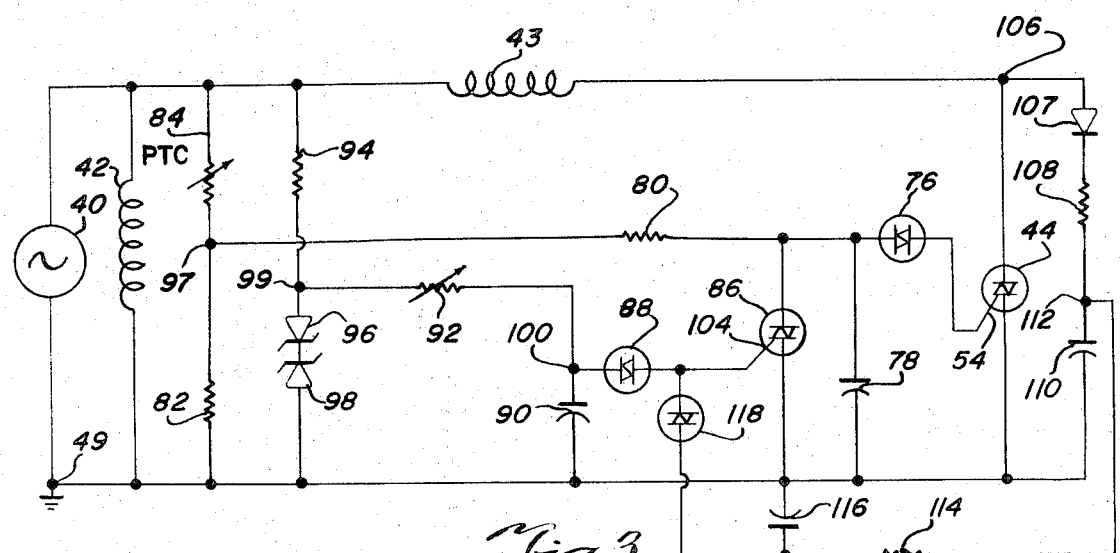
FIG. 3 is a circuit schematic of the start winding switch for removing power from the start winding.

Turning now to FIG. 3, an embodiment of the motor start winding switch is shown with the switch control means 46, previously shown in block form, indicated in schematic form. Similar circuit elements are given identical reference numerals as those in FIG. 1. Switch control means 46 includes a circuit for generating trigger signal 50 in response to applied voltage 52 reaching phase angle 61, a circuit for disabling the trigger signal generator circuit when applied voltage 52 reaches phase angle 63, and a circuit responsive to Triac 44 turning off for disabling the trigger signal generator circuit to maintain Triac 44 in the off state.

The trigger signal generator circuit comprises a pulse relaxation oscillator formed of bilateral trigger diode, such as an SBS, or silicon bilateral switch 76 (sold under the trademark Diac by General Electric Company), the gate circuit 54 of Triac 44, capacitor 78, resistor 80, resistor 82 and positive temperature coefficient (PTC) resistor 84. Each phase angle of the applied voltage 52 has a corresponding voltage magnitude. During the initial portion of each half wave of the applied voltage, a charging current is conducted through resistors 84 and 82, through resistor 80 to capacitor 78. At a magnitude of the applied voltage corresponding to phase angle 61, the voltage charge across capacitor 78 exceeds the breakover voltage of Diac 76. The Diac turns on and discharges capacitor 78 into gate input 54 of Triac 44. Diac 76 then turns off, capacitor 78 recharges, and the cycle is repeated, thereby generating pulse burst trigger signal 50, shown in FIG. 4, until capacitor 78 is no longer allowed to charge.

Capacitor 78 is prevented from charging when Triac 86 assumes a low impedance, "on" state. A temporary disabling circuit turns Triac 86 on in response to applied voltage 52 reaching phase angle 63 during each half wave. The temporary disabling circuit comprises Diac 88, capacitor 90, variable resistor 92, resistor 94 and Zener or avalanche diodes 96 and 98. Resistor 94 and avalanche diodes 96 and 98 form a regulated voltage divider which produces a constant peak voltage wave at junction 99, equal to the avalanche diode reverse blocking breakdown voltage, regardless of power supply voltage variations. Variable resistor 92 and capacitor 90 comprise an RC time delay circuit. During each half cycle a voltage is established at junction 99 and capacitor 90 charges through variable resistor 92. When the voltage across capacitor 90 at junction 100 exceeds the breakover voltage of Diac 88, the Diac conducts, and dishcarges the capacitor into gate input 104 of Triac 86 which turns on in response thereto. The phase angle 63 is selected by changing the resistance value of variable resistor 92 to alter the charging time of capacitor 90. Once Triac 86 turns on, it remains on until the current therethrough from resistors 84 and 80 decreases below the minimum holding current value at the next zero crossing of applied voltage 52. The operation is repeated each half cycle.

PTC resistor 84 provides start winding protection against the occurrence of a locked rotor condition. This protection may be necessary where, due to a motor overload, the motor never reaches cut-out speed, and thus, power is never removed from the start winding causing damage thereto. When power is applied to the start winding, PTC resistor experiences a rise in temperature which causes an increase in its resistance value. This increase in resistance value causes the voltage at junction 97 to drop. The voltage at junction 97 continues to drop until it decreases below the breakover voltage of Diac 76, thereby disabling the trigger signal generator circuit at the maximum allowable elapsed start time. The thermal time constant of the PTC resistor 84 is in excess of the longest possible start time under high initial load conditions and, thus, does not interfere with the normal operation of the start winding switch.

When the cut-out speed is reached, as shown in FIG. 4, start winding current zero cross-over point 60 occurs after the end of the trigger signal at phase angle 63 and Triac 44 turns off. A lock-out circuit is activated to disable the trigger signal generator by turning on Triac 86. This may be necessary, for if the trigger signal generator continued to operate Triac 44 might turn on during the latter portion of each half wave of the line voltage in response to the trigger signal occurring during phase interval 101 shown in FIG. 4 after the voltage wave 52 reverses polarity.

After Triac 44 turns off, the sum of the applied voltage from source 40 and the voltage induced in start winding 43 appears at junction 106. The voltage across Triac 44 is rectified by diode 107 filtered by resistor 108 and capacitor 110, producing a DC potential at junction 112. A relaxation pulse oscillator furnishes a second trigger signal 119, FIG. 4, to gate input 104 of Triac 86. The relaxation oscillator portion of this second circuit is made up of Diac 118, capacitor 116 and resistor 114. During the positive half wave of the voltage sum at junction 106, power is supplied to the oscillator through diode 107 and resistor 108. Capacitor 110 is charged during the positive half wave and has a sufficiently large capacitance value to power the relaxation oscillator during the negative half wave of the voltage sum at junction 106.

Figure 5:
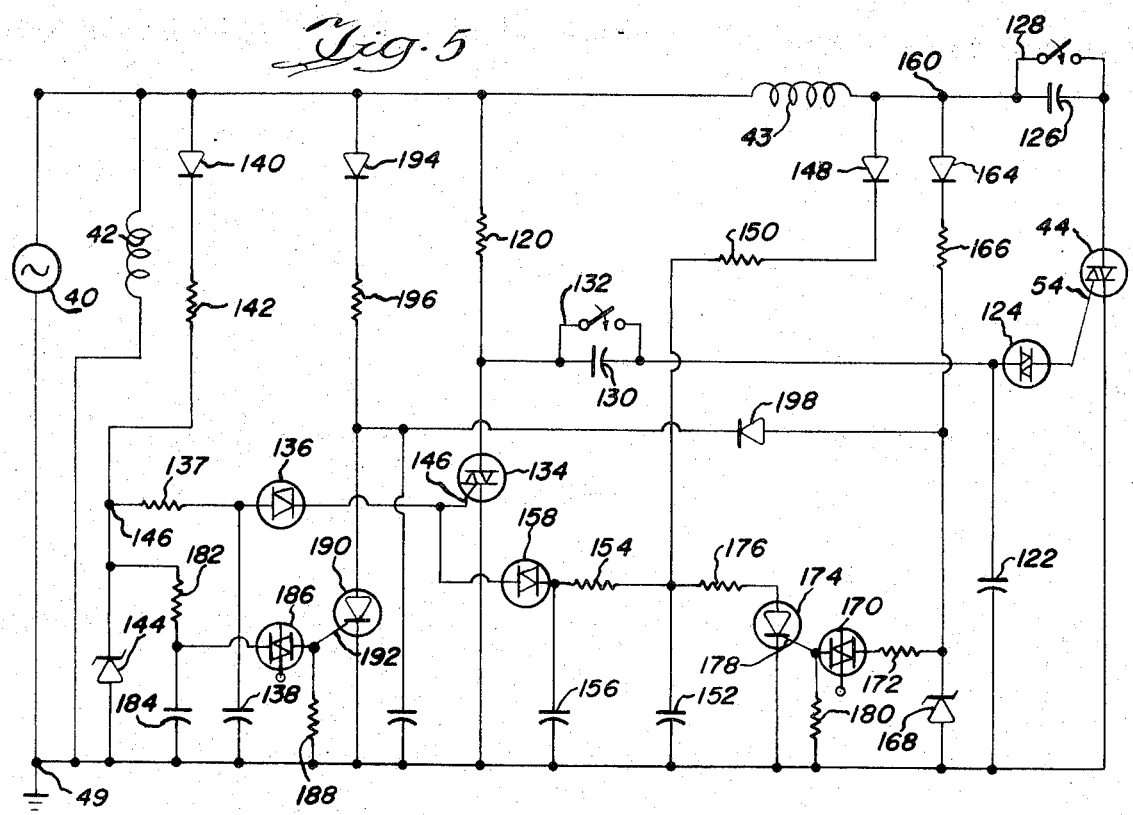
FIG. 5 is a schematic diagram of the motor start winding switch for removing power from the start winding and for reapplying power thereto if motor speed is reduced.

As previously mentioned, the phase of the voltage at junction 106, the sum of the applied voltage and the voltage induced across start winding 43, varies with motor speed. This start winding or sum voltage phase characteristic is utilized in the circuits of FIGS. 5 and 7 to reapply power to the start winding if the motor speed falls below a preselected cut-in speed. In FIG. 5, the trigger signal generator circuit is similar to that of FIG. 3 and comprises a resistor 120, a capacitor 122 and a Diac 124, which is coupled to gate input 54 of Triac 44 and operates in the manner previously explained.

Figure 6A:
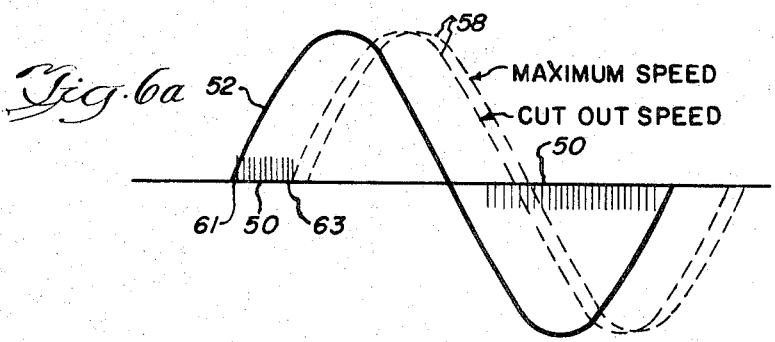
FIG. 6a is a representative waveform showing the relative phase between the applied voltage, the start winding current and the trigger signal, at various motor speeds, in the circuit of FIG. 5.

The trigger signal generator circuit operates during both the positive and negative half waves of the applied voltage. Only during the positive half wave of the applied voltage does the disabling circuit limit the duration of the trigger signal. The disabling circuit comprises a Triac 134 coupled across capacitor 122, a Diac 136, a resistor 137, a capacitor 138 and a voltage regulator divider comprising diode 140, resistor 142 and avalanche diode 144. During the positive half wave of the applied voltage, current flows through diode 140, resistor 142 and avalanche diode 144. A regulated voltage at junction 146 charges capacitor 138 through resistor 137 until the voltage across capacitor 138 exceeds the breakover voltage of Diac 136. When this breakover voltage is exceeded, Diac 136 conducts the stored charge of capacitor 138 into gate input 146 of Triac 134. Triac 134 turns on and shunts to ground the charge across capacitor 122. Thus, during the positive half wave of applied voltage 52, trigger signal 50 is generated during the interval between phase angles 61 and 63. During the negative half wave of the applied voltage, diode 140 is in a blocking state and trigger signal 50 is generated during most of the negative half wave of the applied voltage as shown in FIG. 6a. Thus, in the circuit of FIG. 5, Triac 44 can only be turned off during the positive half wave of the applied voltage.

Many motors have a phase shift starting capacitor in series with the start winding to increase starting torque. Start capacitor 126 is shown in FIG. 5 with switch 128 coupled thereacross. With switch 128 in the open position as shown, the current through Triac 44 is phase shifted with respect to the voltage across start winding 43, and a loss of starting torque will occur if this phase shift is not compensated for. With switch 132 in the open position as shown, compensating capacitor 130 is serially coupled between Diac 124 and resistor 120 and introduces a compensating phase shift into the charging current of capacitor 122 so that trigger signal 50 is phase shifted by an amount equal to the phase shift introduced by starting capacitor 126.

Figures 6B, 6C:
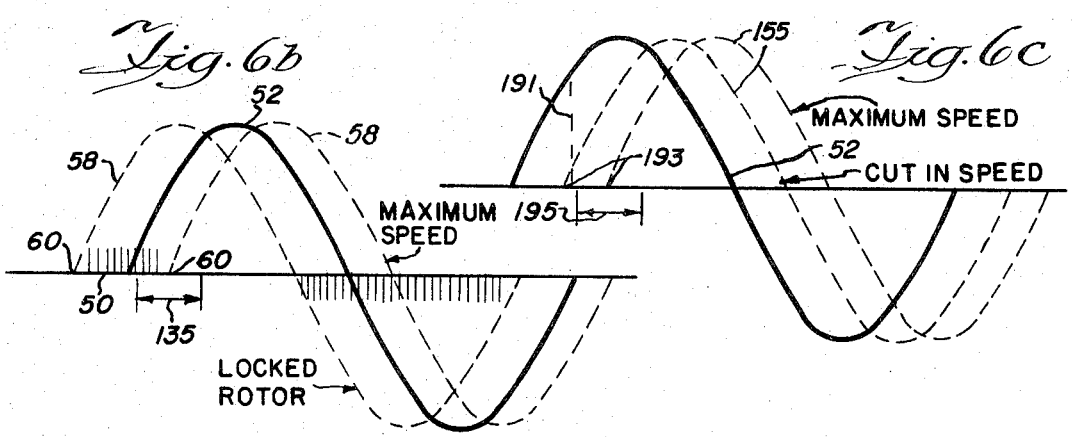
FIG. 6b is a representative waveform showing the relative phase of the applied voltage, the start winding current and the trigger signal at various motor speeds with a trigger signal phase shifting capacitor introduced to compensate for the phase shift introduced by a motor starting capacitor in the circuit of FIG. 5.
FIG. 6c is a representative waveform showing the relative phase between the applied voltage and the sum of the induced and applied start winding voltage with the start winding nonconducting at various motor speeds in the circuit of FIG. 5.

FIG. 6b shows the phase of trigger signal 50 with respect to applied voltage with switch 132 in the open position. With switch 132 in the closed position, trigger signal 50 would occur during interval 135, which would not coincide with zero cross-over point 60 at locked rotor speed which would coincide with zero cross-over point 60 at maximum speed. Thus, without compensating capacitor 130, power would be applied to the start winding when it should be removed and removed when it should be applied.

The circuit for preventing Triac 44 from turning on after it has initially turned off is identical to that of the circuit shown in FIG. 3, comprising diode 148, resistor 150, capacitor 152, resistor 154, capacitor 156 and Diac 158, and operating in a manner previously explained.

As shown in FIG. 6c, the phase of the sum of the applied voltage and the voltage induced across start winding 43, voltage sum 155, developed at junction 160, varies with motor speed. This characteristic is utilized to turn off Triac 134 and enable the trigger signal generator circuit to operate when the relative voltage phase reaches a cut-in value. In FIGS. 16–19, this characteristic is utilized to control the initial power application until reaching cut-out speed, as will be explained. Returning to FIG. 5, the enabling means comprises a first switching circuit responsive to the phase of voltage sum 155 to turn off Triac 134 and a second switching circuit responsive to the phase of applied voltage for disabling the first switching circuit for all values of relative voltage phase greater than the cut-in value.

The first switching circuit comprises a diode 164, resistor 166 and an avalanche diode 168 coupled in series from junction 160 to ground reference potential 49. A silicon unilateral switch (SUS) 170 is coupled through a resistor 172 across avalanche diode 168 and applies a voltage to the gate of reverse blocking diode thyristor (SCR) 174 which is connected through resistor 176 across capacitor 152. Resistor 180 couples the anode of SUS 170 to ground.

The second switching circuit includes serially connected resistor 182 and capacitor 184 connected across avalanche diode 144. An SUS 186 and series resistor 188 are connected across capacitor 184 and with the gate input 192 of SCR 190, which is coupled across the applied voltage through diode 194 and resistor 196. A diode 198 couples the junction between resistor 196 and SCR 190 of the second switching circuit to the junction between resistors 166 and avalanche diode 168 of the first switching circuit.

During the positive half wave of the applied voltage, current flows through diode 140, resistor 142 and avalanche diode 144 with avalanche diode 144 clamping the voltage at a fixed level independent of applied voltage magnitude. Capacitor 184 charges through resistor 182 until the breakover voltage of SUS 186 is reached at which time the SUS assumes a low impedance state which turns on SCR 190. The breakover voltage of SUS 186 occurs when applied voltage 52 assumes a phase angle 191, FIG. 6c. SCR 190, once turned on, remains on for the duration of the positive half wave of the applied voltage.

The voltage sum 155 at junction 160 becomes positive at phase angle 193. Current flows through diode 164, resistor 166 and avalanche diode 168. If voltage sum 155 at junction 160 reaches phase angle 193 after applied voltage 52 has assumed phase angle 191, SCR 190 turns on, and the voltage at the junction between resistor 166 and avalanche diode 168 will be clamped at 1.4 volts above ground reference potential 49, through diode 198 and SCR 190, thus disabling the first switching circuit. If voltage sum 155 reaches phase angle 193 prior to SCR 190 turning on, the voltage at the junction between resistor 166 and avalanche diode 168 will not be shunted to 1.4 volts above ground reference potential 49. When this voltage exceeds the breakdown voltage of SUS 170, current is conducted through resistor 172 to gate input 178 of SCR 174 which will assume a low impedance "on" state in response thereto. Upon SCR 174 turning on, capacitor 152 is discharged through resistor 176 and SCR 174 to ground reference potential 49. This removes the input to gate 146 of Triac 134 which will turn off in response thereto thereby enabling the trigger signal generator for Triac 44.

Referring now to FIG. 6c, SCR 190 turns on at phase angle 191 of applied voltage 52. Voltage sum 155 reaches phase angle 193 after applied voltage 52 reaches phase angle 191 for all values of relative voltage phase greater than the cut-in value 195. The relative voltage phase is greater than cut-in value 195 during all speeds between cut-in speed and maximum speed. When the relative phase is less than cut-in value 195 corresponding to a speed slower than the cut-in speed, voltage sum 155 reaches phase angle 193 prior to the time applied voltage 52 reaches phase angle 191.

Figure 7:
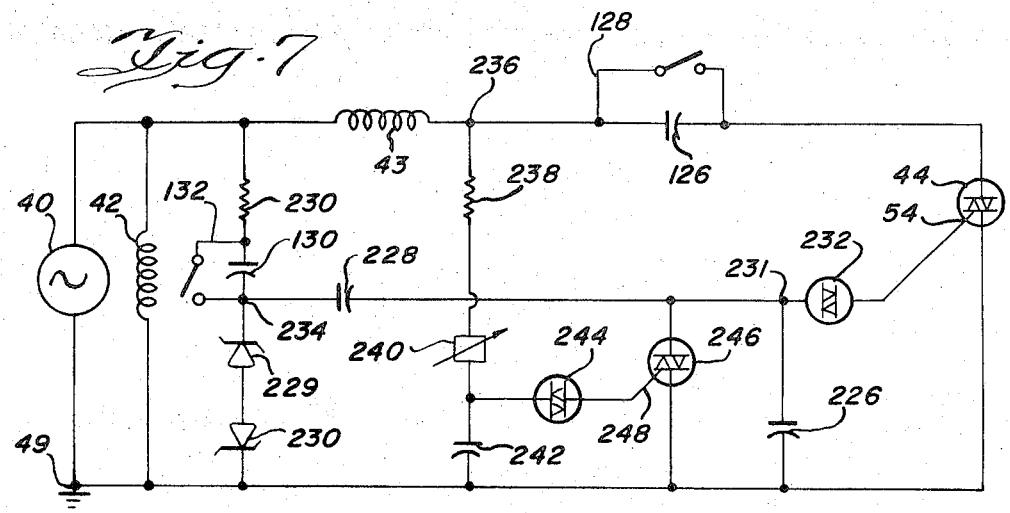
FIG. 7 is a circuit schematic of another embodiment of the motor start winding switch.

Referring now to FIG. 7, a circuit of a preferred embodiment of the motor start winding switch having the capability of both removing and reapplying power to the start winding is shown. This circuit also utilizes the two previously mentioned electrical characteristics that vary with motor speed. With starting capacitor shorting switch 128 and phase compensating switch 132 both in the closed position, capacitors 226 and 228 are charged through resistor 230 from the applied voltage which is regulated by the breakdown voltage of either avalanche diode 229 or 230. When the voltage across capacitor 226 exceeds the breakover voltage of Diac 232, it conducts, discharging capacitor 226 into gate input 54 of Triac 44 which turns on. This relaxation oscillator continues to operate until capacitor 228 is charged to a voltage which is greater than the regulated voltage at junction 234 minus the breakdown voltage of Diac 232. With capacitor 228 charged, no more current can flow to charge capacitor 226, and thus, the trigger signal oscillations cease at phase angle 63 as shown in FIG. 8a.

When the relative phase shift between the start winding current and the applied voltage assumes the cut-out value, Triac 44 will not receive a trigger signal during the zero cross-over point and will turn off. As previously explained, when Triac 44 turns off, the sum of the applied voltage and the voltage induced in start winding 43 is developed at junction 236 and a second trigger signal generator is actuated. When voltage appears at junction 236, current flows through resistor 238 and frequency dependent impedance 240 (as a capacitor or inductor) to charge capacitor 242. When the charge across capacitor 242 exceeds the breakover voltage of Diac 244, Diac 244 turns on and discharges capacitor 242 into gate input 248 of Triac 246. The second trigger signal 245 is generated during each positive and negative half wave of voltage sum 155 at junction 236. Triac 246 assumes a low impedance "on" state in response to the second trigger signal, shorts out capacitor 226 and thus keeps Triac 44 from turning back on.

As previously explained, the phase of the applied voltage and the voltage developed at junction 236 varies with motor speed. Capacitor 228 maintains a preselected phase relationship between the current through Triac 246 and the applied voltage. Triac 246 turns on in response to the second trigger signal and turns off in response to the current therethrough falling below a minimum holding current value unless second trigger signal 245 is being generated at the source voltage cross-over point 247. The second trigger signal is generated during a portion of each half wave of the applied voltage and occurs during the applied voltage crossover until and only until the relative voltage phase assumes a value corresponding to the cut-in speed.

Figure 8C:
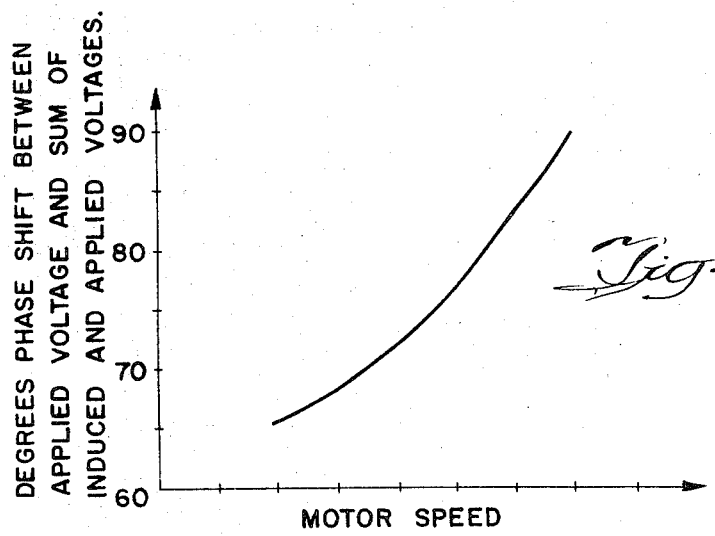
FIG. 8c is a plot of relative voltage phase as a function of motor speed for the circuit shown in FIG. 7.
Figure 8A:
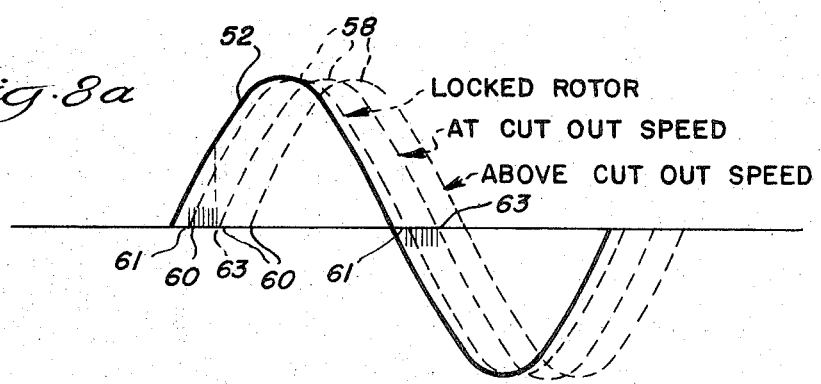
FIG. 8a is a representative waveform showing the relative phase between the applied voltage, the start winding current and the trigger signal at various motor speeds in the circuit shown in FIG. 7.
Figure 8B:
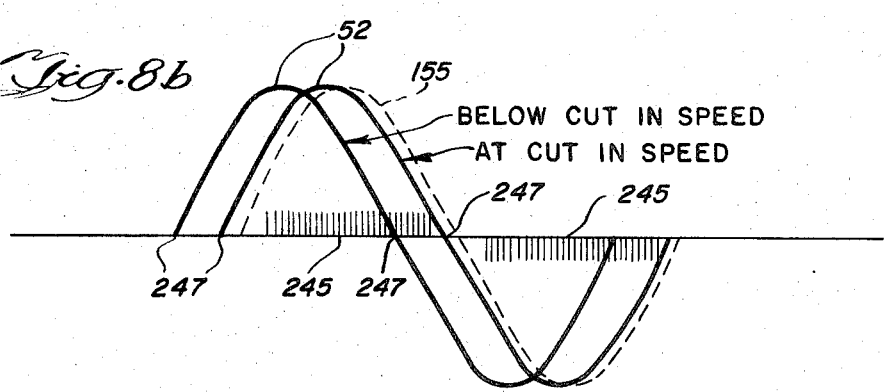
FIG. 8b is a representative waveform showing the relative phase between the applied voltage, the sum of the applied an induced start winding voltages, and a second trigger signal at various motor speeds in the circuit shown in FIG. 7.

The relative phase between the applied voltage, and the voltage sum at cut-in speed and at speeds greater than cut-in speed are shown in FIG. 8a. A plot of relative voltage phase versus motor speed is shown in FIG. 8c. As previously mentioned, the third preselected phase angle of the current through Triac 246 corresponds to zero cross-over point 247 of applied voltage and, as can be seen, occurs prior to the second trigger signal at the cut-in speed. when second trigger signal 245 is not generated simultaneously with the zero cross-over point of the current through Triac 246, Triac 246 turns off thus enabling capacitor 226 to charge from capacitor 228 to turn on Diac 232 which turns on Triac 44 to reapply power to start winding 43.

Figure 9:
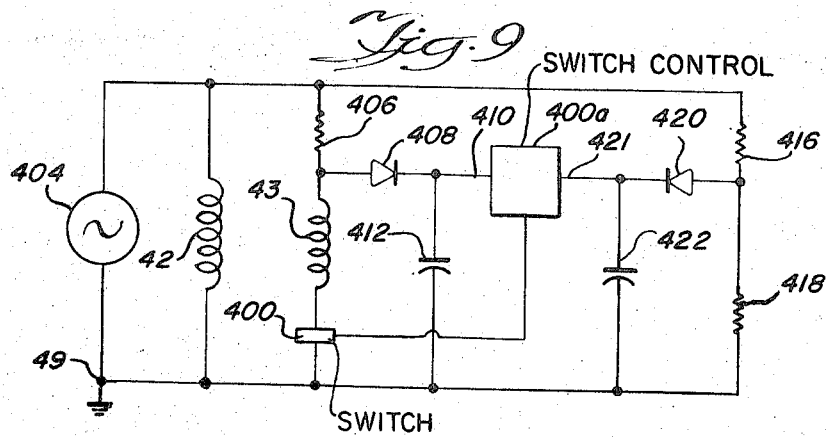
FIG. 9 is a circuit schematic of a magnitude or scalar responsive embodiment of the motor start winding switch.

Another electrical characteristic of some motors is that the absolute magnitude of the voltage induced across the start winding is approximately proportional to the speed of the motor and the absolute magnitude of the power source voltage. A motor start winding switch that utilizes this characteristic in a novel way is shown in FIG. 9. A switch means 400 in series with start winding 43 is connected with a source of alternating power 404 through an impedance 406 as a resistor, or capacitor in a capacitor start motor. Diode 408 has an anode connected with the junction between start winding 43 and resistor 406 and a cathode connected with input 410 of switch control means 400a. The junction between the anode of diode 408 and input 410 is coupled to ground reference potential 49 through filtering capacitor 412.

Resistors 416 and 418 comprise a potentiometer and the voltage appearing at the junction between these two resistors, or first alternating voltage, is directly proportional to the alternating power source voltage across main winding 42. Diode 420 rectifies this voltage and capacitor 422 filters out the alternating portion of this first alternating voltage to develop a scalar signal, that is, a DC signal which does not have a phase angle.

The voltage induced across start winding 43 is proportional to both the power source voltage and the motor speed. This induced voltage, a second alternating voltage, appears at the junction between series resistor 406 and start winding 43 and is rectified by diode 408 and the alternating portion is filtered out by capacitor 412 to develop another scalar signal.

Figure 10:
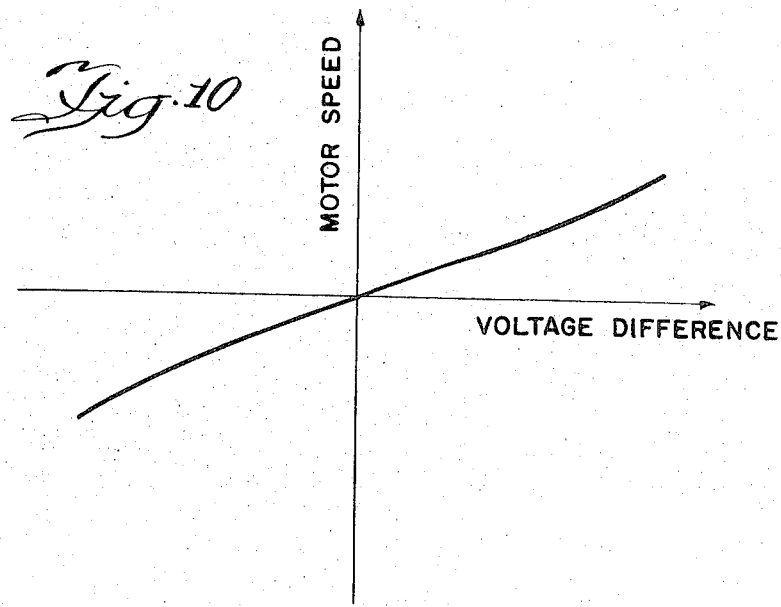
FIG. 10 is a plot of the arithmetic difference of two voltages developed in the circuit shown in FIG. 9 versus motor speed.

The resulting scalar signals at inputs 421 and 410 are first and second DC voltages having magnitudes respectively proportional to the absolute magnitude of the voltage induced across the start winding and the absolute magnitude of the power source voltage. The difference between the two voltages varies with motor speed, as shown in FIG. 10. As can be seen, the resulting voltage difference will be negative below a certain cross-over speed, zero at that speed and then positive increasing rapidly with higher speeds. This cross-over speed depends upon what proportion the magnitude of the signal input 420 is of the applied power source voltage, determined by the relative values of resistors 416 and 418.

Figure 11:
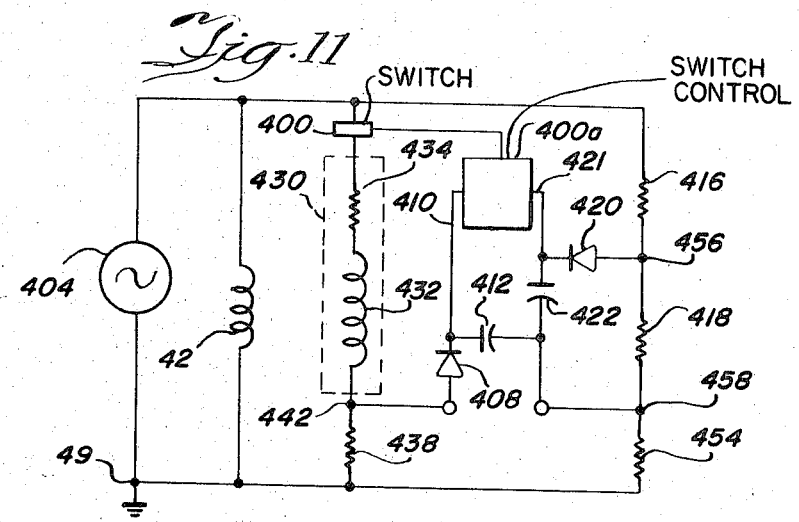
FIG. 11 is a circuit schematic of yet another embodiment of the scalar responsive motor start winding switch.

Switch control means 400a may, for example, be a differential comparison amplifier, and responsive to the arithmetic difference in the magnitudes of the signals at inputs 410 and 421 to remove power from start winding 43.

Where the start winding has a distributed resistance which is large, the circuit of FIG. 11 may be used. Start winding 430 is schematically represented by a zero resistance coil 432 in series with resistor 434 having a resistance equal to the distributed resistance. The start winding 430 is connected with power source 404 through series resistor 438, and main winding 42 is directly coupled across power source 404. The resistance value of distributed resistor 434 has a relatively large value (as 10 times) with respect to resistor 438. A voltage divider comprising series resistors 416, 418 and 454 is connected across power source 404 and provides voltages proportional to the power source voltage at junctions 456 and 458. Diodes 408 and 420, filtering capacitors 412 and 422 and switch control means 400a are connected as in the circuit of FIG. 9 except that the filtering capacitors 412 and 422 are connected to a reference potential at junction 458 rather than to ground reference potential 49. The voltage across resistor 438 is effectively subtracted from the voltage across resistor 454 and the voltage across capacitor 412 is proportional to the vector difference between the line voltage and the voltage across the resistive portion of the start winding. This is effectively proportional to the voltage across the inductive portion 432 of the start winding.

Series resistor 438 is necessary, for voltage across the inductive portion of the start winding is not directly available. By adding series resistor 438, having a small resistance value with respect to the equivalent distributed resistance 434, a voltage at junction 442 is developed which is proportional to the voltage across the equivalent resistance 434 of the start winding both in magnitude and in phase. The proportion factor depends upon the ratio of the series resistor 438 with respect to the equivalent start winding resistance 434. A corresponding proportional power source voltage is developed at junction 458 and this voltage at junction 458 is used as the reference potential rather than ground reference potential 49 as in the circuit of FIG. 9. The remaining circuitry operates as does the circuitry of FIG. 9 except that the reference potential in the present circuit is the voltage at junction 458 rather than the ground reference potential used in the circuit of FIG. 9.

In FIG. 12, another embodiment of the voltage comparison circuit is illustrated. In this circuit, the applied voltage magnitude is compared with respect to the magnitude of the voltage across a start capacitor 500. A diode 502 rectifies the AC applied voltage from AC source 404, and charges a series connected capacitor 504 to the peak voltage of the negative half cycle of AC source voltage. A second diode 506 and series connected capacitor 508 are coupled across the junction between start winding 43 and start capacitor 500, and ground 49. Diode 506 initially rectifies the sum voltage across start winding 43 until a Triac 510 turns on and causes current to flow through the start winding and start capacitor. At that time, diode 506 rectifies the voltage across the start capacitor 500 and Triac 510. Since the Triac voltage drop is very small, as on the order of 1.5 volts, it can be neglected. Therefore, either the rectified sum or the rectified start capacitor voltage appears across capacitor 508, with a positive polarity.

The pair of DC or scalar voltages across capacitors 504 and 508 are then algebraically summed by a pair of resistors 514 and 516, having a summing junction 518 therebetween coupled through a capacitor 520 to ground 49. Due to the difference in polarities of the scalar signals across capacitors 504 and 508, the sum results in a difference voltage which is further filtered by the capacitor 520.

A relaxation oscillator is formed by a resistor 522 and a Diac 524 in series between junction 518 and the gate terminal of Triac 510, and by a capacitor 526 coupled between the junction of resistor 522 and Diac 524 and ground 49. The relaxation oscillator supplies gate pulses to the Triac 510 as long as the voltage across capacitor 520 is at a potential which is higher than the breakdown voltage of the Diac 524. Resistors 514 and 516 are relatively chosen in value so that when the motor speed is less than cut-out speed, the DC potential across capacitor 520 is high enough to cause the relaxation oscillator to be enabled. As motor speed increases to cut-out speed, the start capacitor voltage increases rapidly and causes the difference voltage across capacitor 520 to become more positive, thus causing the relaxation oscillator to turn off. This in turn causes the Trial to turnoff.

The sum voltage, available when the Triac 510 is off, is of a magnitude similar to the start capacitor voltage at full speed. This fact insures that the difference voltage cross capacitor 520 will be maintained, since after the start capacitor is no longer in the circuit, only the sum voltage is present. It should be noted that either the sum voltage, or the start capacitor voltage, is present at any one time, but both voltages are not present simultaneously. The difference voltage should not be allowed to become too positive at full motor speed, or the relaxation oscillator will begin to again turn on. If the particular motor being utilized has this characteristic, a diode (not illustrated) in series with the Diac 524 will make the Diac unidirectional and prevent this problem. It should be noted that the illustrated circuit works equally well if all polarities of the components are reversed.

As the motor speed is reduced, the sum voltage will decrease until the difference voltage appearing across capacitor 520 causes the relaxation oscillator to be turned on, thus turning on the Triac 510 and coupling the start winding 43 across the AC source 404. The operation of the above circuit, as well as the remaining scalar responsive circuits, is essentially independent of line voltage variations. For one form of a scalar responsive circuit which was constructed, the line voltages were varied over a 40 percent range (±20 percent), but the speed at which the difference voltage was zero varied by only 40 rpm in 2,700 rpm, which represents a variation of less than ±1 percent. This negligible variation is less than the variation experienced in centrifugal switches, and represents a substantial improvement over prior circuits. Also, a large change in difference voltage occurs with only a slight change in speed, and the percentage change in the difference voltage is greater than the percentage change in motor speed. These characteristics, as well as the fact that the difference voltage goes through zero and changes polarity, are distinct advantages in implementing the circuit.

The above advantages are derived due to comparison of DC voltages which have no phase angle, rather than comparison of AC voltages as has been practiced heretofore. When comparing AC voltages, the result is a vector difference and is affected by magnitude and angle. Using DC voltages gives a scalar difference and disregards phase angle. In the case of a vector difference, at each speed the vector triangle is such that increasing the line voltage and the start winding voltage by a given factor increases the difference voltage by about the same factor. By taking the scalar or magnitude difference, a difference voltage exists which is very negligibly affected by line voltage variations, resulting in a substantially improved control.

In FIG. 13, another form of the scalar voltage comparison technique of speed sensing is illustrated. One disadvantage of scalar comparison of applied voltage versus start capacitor voltage, as described for the circuit of FIG. 12, is that the start winding cut-out speed cannot be selected at any desired value on the start capacitor voltage curve, due to its relatively flat shape throughout a range of intermediate speeds. As a result, the typical cut-out speed will be quite high and may approach the service factor motor speed. For certain general purpose motor loads, the resulting high cut-in speed might be considered undesirable, and the circuit of FIG. 13 overcomes this problem.

The circuit of FIG. 13 compares the applied voltage to the start winding sum voltage, that is, applied voltage plus induced voltage. The circuit has two forms, controlled by the position of a pair of ganged single-pole, double-throw switches 540 and 542. When the switches are located in the illustrated position, there is no cut-in of the start winding 43 when the motor rpm is reduced by excessive loading. For certain applications, such as centrifugal pumps, fan loads, etc. start winding cut-in is not required. For other applications, it is a distinct advantage to retain a start winding cut-in feature, and in this instance, the pair of switches 540 and 542 may be actuated to their other position.

Diode 502 rectifies the applied voltage and causes a charge equal to the negative peak of the applied voltage to build across capacitor 504. Diode 506, which may be coupled either through a resistor 546 or through a shunt, depending upon the position of switch 542, rectifies the voltage across the start winding and charges capacitor 508 to magnitude equal to the positive peak of the start winding voltage. It should be noted that the Triac 510 must be conducting for this voltage to be present. The two voltages are algebraically summed and control a relaxation oscillator, formed by the capacitor 520 and the Diac 524.

If the difference voltage at junction 518 is more negative than the breakdown potential of the Diac 524, the relaxation oscillator is excited and causes triggering of the Triac 510. The ratio of both resistors 516 and 514 is selected to insure that at zero speed, when the Triac is not conducting, the sum voltage will cause the relaxation oscillator to become enabled. The summing network is essentially comparing line voltage to line voltage until the Triac is initially turned on. As motor speed increases, the sum voltage goes more positive until it no longer causes the relaxation oscillator to turn on the Triac. The speed at which this happens is determined by the ratio of resistors 516 and 514 for any given value of start capacitor 500.

When switches 540 and 542 are switched from the illustrated position, the start capacitor 500 is left charged to the peak voltage across it when the Triac 510 turns off at current zero. This DC voltage is now riding on top of the applied voltage, causing the charge on capacitor 508 to go to a much higher value. The sum voltage (which represents a difference due to the polarities across capacitors 504 and 508) goes more positive, but a diode 550 shunting capacitor 520 clamps this voltage near reference ground, preventing the Diac 524 from breaking down in a reverse direction. A resistor 552, shunting start capacitor 500, causes the start capacitor to discharge. As the start capacitor is discharged, the sum voltage appears at a junction 556 between the start winding 43 and the Triac 510. This sum voltage is rectified by a diode 558 (the switch 540 being actuated) to insure that capacitor 508 remains sufficiently charged to cause the sum voltage to remain near zero.

If the motor speed is now reduced to a point where the sum voltage is less than was the start winding voltage at cut-out speed, the sum voltage at junction 518 will be sufficiently negative to cause the oscillator to turn on the Triac 510. If the motor speed is above cut-out speed, the Triac will conduct for no more than one cycle, and then go through the cut-out operation again. If the motor is decelerated further so that it is at less than cut-out speed, then the start winding will stay in circuit until cut-out speed is reached. The time between the first cycle of conduction and subsequent cut out, and the start winding staying in circuit, is determined by the time constant of resistor 552 and start capacitor 500.

If it is desired that the start winding should not be allowed to cut back in, the switches 540 and 542 would remain in the illustrated position. With such a configuration, the ratio of resistors 514 and 516 is such that at zero speed, when the Triac is not conducting, the relaxation oscillator is not enabled. A summing network compares line voltage to line voltage. The resistor 546 assures that capacitor 504 will be charged before capacitor 508, regardless of where in the cycle the power is first turned on. Since capacitor 504 is charged first, it enables the relaxation oscillator.

As soon as the Triac 510 conducts, the summing network compares applied voltage to start winding voltage, which as seen in FIG. 14 is substantially less than applied voltage. The start winding will remain in the circuit until cut-out speed is reached. Resistor 546 is selected so that the time constant of resistor 546 and capacitor 508 is approximately 8-⅓ milliseconds, that is, one-half wave for a 60 cycle frequency AC source 404. The addition of resistor 546 slows up the response of the circuit. If the motor accelerates very rapidly, the cut-out speed may be higher than if the motor accelerated at a slower rate. Once the start winding is switched out of the circuit, it will remain out until power is removed and reapplied.

In FIG. 14, the sum voltage $V_{SUM}$ is illustrated for a discharged start capacitor. The start winding voltage $V_{START}$ is also illustrated. The circuit connections which provide the illustrated voltages are shown in FIGS. 15a and 15b.

Figure 17:
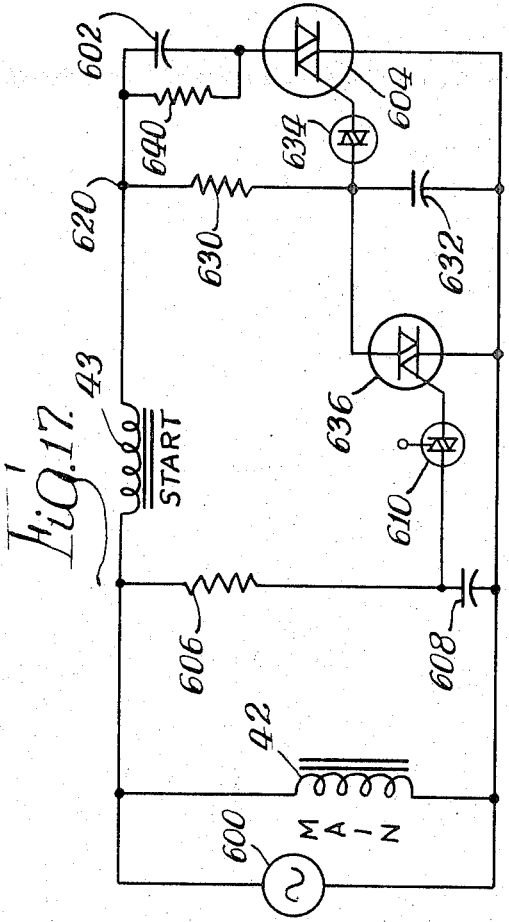
FIG. 17 is a circuit schematic of another embodiment of the voltage phase responsive motor start winding switch.
Figure 16:
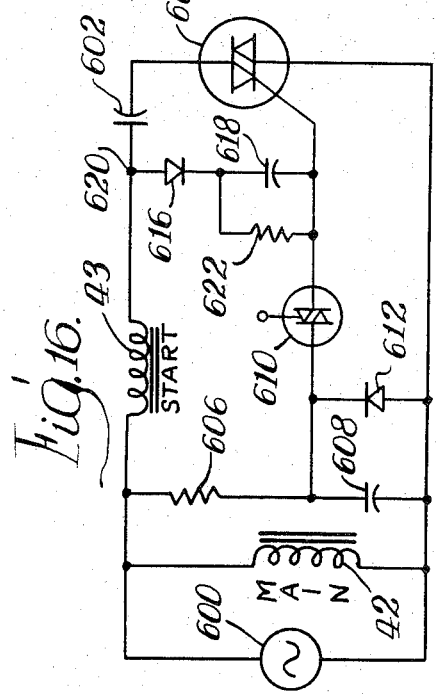
FIG. 16 is a circuit schematic of a voltage phase responsive motor start winding switch.
Figure 18:
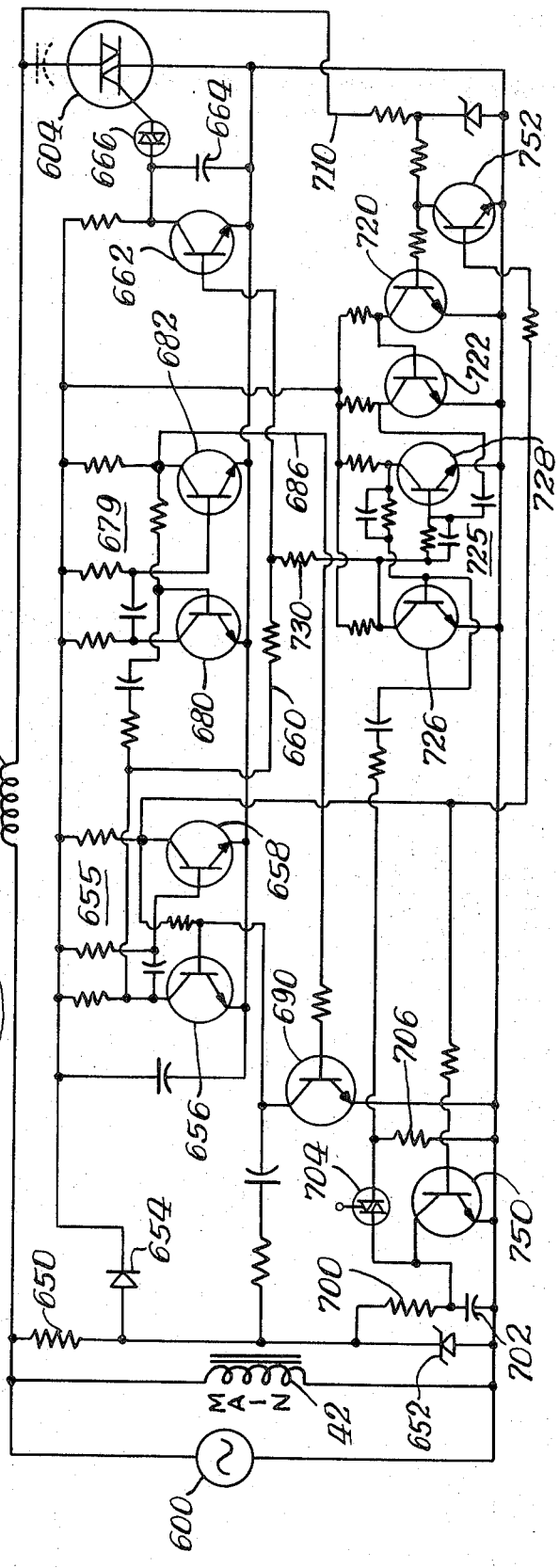
FIG. 18 is still another embodiment of the voltage phase responsive motor start winding switch.
Figure 19:
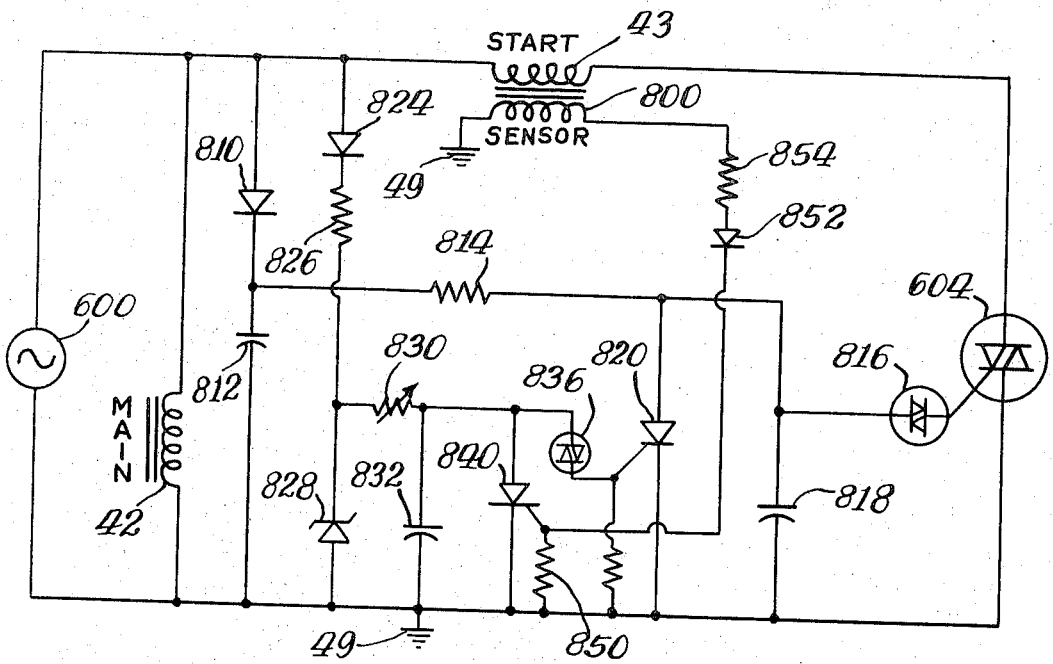
FIG. 19 is a circuit schematic of a further embodiment of the voltage phase responsive motor start winding switch.

In the remaining figures, circuits which control the initial application of power to the start winding are illustrated which are responsive to the phase of the start winding voltage with respect to applied voltage. The remaining circuits thus extend FIGS. 5 and 7 which were only effective to reapply power under control of this voltage phase comparison. In FIGS. 16 and 17, a pair of circuits are illustrated which are suitable for use with capacitor start motors. In FIGS. 18 and 19, circuits are illustrated which can control noncapacitor start motors, which present special problems as will be explained.

In FIG. 16, an AC power source 600 can apply power to a series connected start winding 43 and start capacitor 602 when a Triac 604 is gated into conduction. As the upper line of source 600 goes positive, current flows through a resistor 606 and charges a capacitor 608 until the breakdown potential of a silicon bilateral switch (SBS) 610 is reached, typically 8 volts. The breaking down of the SBS causes a positive gate pulse to be furnished to the Triac 604. The time of occurrence of this pulse with respect to the zero crossing of applied voltage can be chosen by adjustment of the time constant of resistor 606 and capacitor 608. When the upper line goes negative, no pulse is generated because capacitor 608 is shunted by a diode 612. It should be noted that a silicon unilateral switch (SUS) could be used in place of the SBS 610, but diode 612 would still be necessary due to the low reverse blocking voltage of typical SUS's.

Because the circuit uses a start capacitor, the start winding current is generally leading the sum voltage.

To gate the circuit during the negative half wave, a diode 616 and series capacitor 618 are coupled between the gate of the Triac 604 and a junction 620 between the start winding 43 and the start capacitor 602. A resistor 622 shunts capacitor 618. When the start winding current goes to zero, the Triac turns off and the voltage thereacross goes to the value of the sum voltage. This sharp rate of rise of voltage is fed back through diode 616 to turn on the Triac for the subsequent half cycle. At cut-out speed, as start winding current goes to zero, the voltage across the Triac goes to the value of sum voltage. At some later time when the positive gate pulse occurs through SBS 610, the voltage across the Triac is close to zero, and therefore the pulse does not turn on the Triac. In this manner, the speed sensing signal is the phase angle of the sum voltage with respect to applied voltage. It should be noted that if capacitor 602 was replaced by a short circuit, and the polarity of diode 616 was reversed, the sensing signal would become a relative phase angle of the start current with respect to applied voltage.

In FIG. 17, another circuit usable with a capacitor start motor is illustrated. A relaxation oscillator is formed by a resistor 630 and capacitor 632 in series across the start capacitor 602 and Triac 604. The relaxation oscillator also includes a Diac 634. The start capacitor 602 is shunted by a resistor 640. When power is applied, a sum voltage equal to applied voltage and induced voltage appears at junction 620, which voltage causes the relaxation oscillator to become excited and enable Triac 604. After each zero crossing of applied voltage, resistor 606 starts to charge capacitor 608 until the breakdown voltage of the SBS 610 is reached. At that time, the SBS latches and in turn energizes Triac 636, shunting the relaxation oscillator and thereby preventing energization of Triac 604. Triac 636 remains latched until the sum voltage goes to zero. The oscillator is then reexcited as the sum voltage increases in the other direction. With the illustrated circuits, both the cut-out speed and cut-in speed are determined by the time constant of resistor 606 and capacitor 608.

Because the sum voltage leads the start winding current in noncapacitor start motors, the circuits of FIGS. 16 and 17 would not be responsive to the phase angle of the sum voltage if the start capacitor was omitted. The circuit of FIG. 18 allows either noncapacitor, or capacitor start motors, to be controlled by the relative phase of the sum voltage with respect to applied voltage. The circuit works as follows. Triac 604 is turned on for a predetermined number of cycles, and then it is turned off for one cycle. During the off cycle, the phase angle between the sum voltage and the applied voltage is monitored (it being noted that the same cannot be monitored while the Triac 604 is on).

If the phase shift is greater than a predetermined value, indicating that cut-out speed has been reached, the circuit does not reenergize Triac 604. If cut-out speed has not been reached, the Triac 604 is enabled again for a number of cycles equal to the initial number of cycles. This sampling condition continues until the motor speed exceeds cut-out speed. Thereafter, if the motor speed should be reduced, the Triac 604 will again be turned on and the above described operation will continue until the motor speed is greater than cut-out speed. The circuit will work equally well with capacitor start or a split phase motor, resulting in a generally universal control which has wide applicability.

During the first positive going half wave, resistor 650 applies voltage across a Zener diode 652, causing a generally positive square wave to be coupled through a diode 654 to enable a one-shot multivibrator 655 formed by transistors 656 and 658. The unstable or unenergized state of the one-shot multivibrator 655 determines the length of time that trigger pulses are furnished to the Triac 604, such as 10 cycles of applied voltage. When the multivibrator goes to its steady state, a line 660 goes positive and forward biases a transistor 662. The forward bias transistor 662 shunts a capacitor 664, which otherwise couples gate pulses through a Diac 666 to enable Triac 604. Thus, gate pulses are blocked from enabling the Triac. At the same time, the one-shot multivibrator 655 also triggers another one-shot multivibrator 679 formed by transistors 680 and 682. One-shot multivibrator 679 has an unsteady state time of one cycle, that is, 16.6 milliseconds for an AC source 600 having a 60 cycle frequency.

When the unsteady state condition occurs in multivibrator 679, a positive voltage is developed on a line 686 which forward biases a transistor 690, preventing the first one-shot multivibrator 655 from being retriggered. During this one off cycle, the phase angle of sum voltage with respect to applied voltage is compared.

The phase comparison occurs as follows. A positive pulse across Zener 652 is coupled through a resistor 700 and a capacitor 702. The charge on capacitor 702 will, after a predetermined delay, enable an SUS 704 and thereby generate a pulse across a resistor 706. This signal is representative of applied voltage, and can be set to correspond with the phase of the sum voltage at cut-out speed by selection of the time constant of the circuit.

The sum voltage at zero crossing, available on a line 710 from start winding 43, is amplified and inverted by transistors 720 and 722. A flip-flop 725, formed by transistors 726 and 728, then compares the signals from resistor 706 and from transistor 722, that is, the phase offset applied voltage with respect to sum voltage. The state of the flip-flop 725 determines whether or not transistor 662 is on or off. If cut-out speed is exceeded, a positive voltage will be coupled through resistor 730 and maintains transistor 662 actuated. This in turn prevents Triac 604 from being enabled, and thus effectively uncouples the start winding 43 from power source 600.

A transistor 750 shunts capacitor 702, and a transistor 752 shunts the sum voltage line 710, both under control of the first one-shot multivibrator 655 to insure that the two signals compared by the flip-flop 725 only occur during the one off cycle. It will be appreciated that the off cycle is a small fraction of the number of on cycles, such as one in ten, and thus no significant starting torque is lost due to uncoupling of the start winding during the time period when the sum voltage is monitored.

Figure 20:
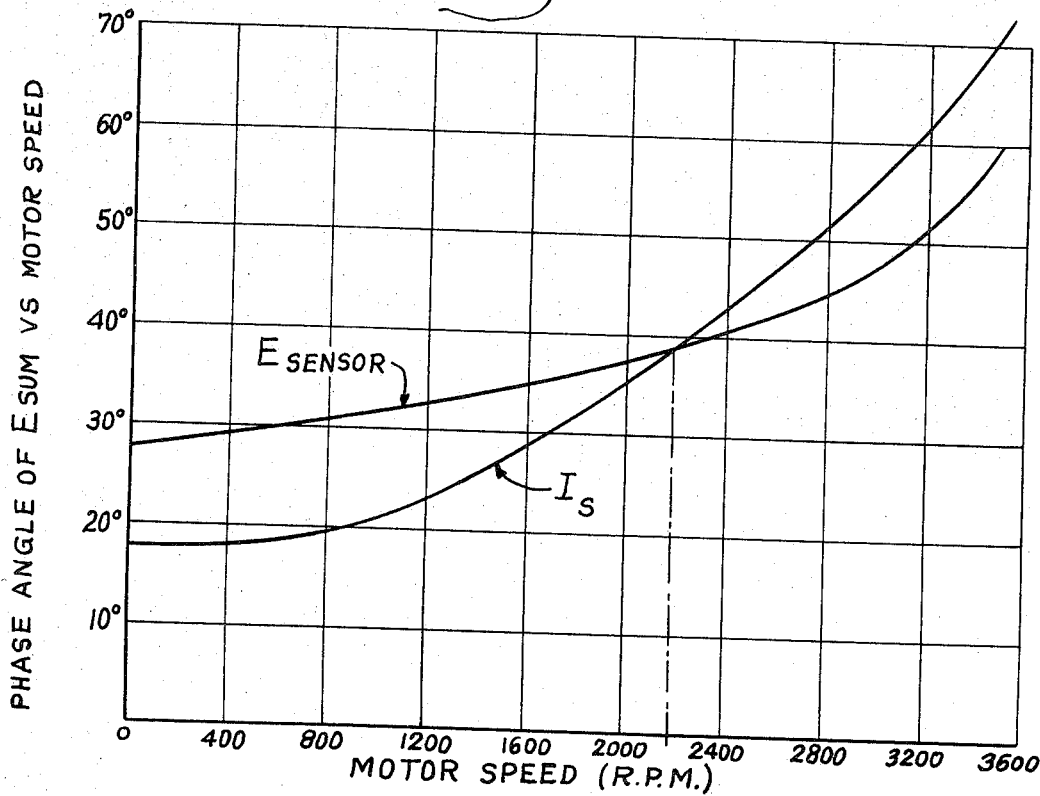
FIG. 20 is a plot of relative sum voltage and sensor voltage versus motor speed for the circuit of FIG. 19.

If uncoupling of the start winding is not desired, even for a relatively short time period, then the circuit of FIG. 19 may be utilized. In this embodiment, the problem of the absence of sum voltage during energization of Triac 604 is overcome by providing an additional sensor winding 800 which is mutually coupled with the start winding 43 and has a voltage $V_{SENSOR}$ thereacross which is substantially similar to the sum voltage. The relation of the sensor voltage $V_{SENSOR}$ with respect to start current $I_S$, for various motor speeds, is illustrated in FIG. 20.

In FIG. 19, positive voltage from the upper line of source 600 is coupled through a diode 810 and charges a capacitor 812. The voltage across the capacitor is coupled through a resistor 814 to a Diac 816 coupled to the gate of Triac 604. A further capacitor 818 is coupled between the junction of resistor 814 and Diac 816, and ground potential 49. At a predetermined phase angle after the zero crossing of applied voltage, the voltage across capacitor 818 will fire Diac 816 and enable Triac 604. This causes the start winding 43 to be coupled to the AC power source.

Capacitor 818 is shunted by a unidirectional thyristor, as an SCR 820, having a gate electrode controlled by the relative phase between the sensor winding voltage (and hence start voltage) relative to applied voltage. To monitor applied voltage, a diode 824, a resistor 826, and a Zener diode 828 are coupled in series across AC source 600. During positive half cycles, a positive square wave is developed across the Zener diode 828 and is coupled through a variable resistor 830 to a capacitor 832. The junction between resistor 830 and capacitor 832 is coupled through a Diac 836 to the gate electrode of SCR 820. The capacitor 832 is shunted by a second unidirectional thyristor, as an SCR 840. The SCR 840 is controlled by the sensor voltage, and it in turn controls whether capacitor 832 has a charge sufficient to trigger SCR 820 and thus disable Triac 604. The gate electrode of SCR 840 is coupled to ground 49 through a resistor 850, and also is coupled through a diode 852, and resistor 854 to sensor winding 800.

As the motor speed increases, a relative phase angle of the sensor voltage, with respect to applied voltage, increases and thus fires SCR 840 at a later point in the cycle. By selection of the time constants, the cut-out speed can be adjusted to that at the time Diac 816 would be triggered due to the voltage across capacitors 812 and 818, SCR 820 is fired after the firing of SCR 840. This prevents further trigger pulses from being generated. The illustrated circuit prevents the Triac 604 from being cut-in when motor speed is reduced. Thus, power must be removed from the circuit before the Triac 604 is again enabled in order to recouple the start winding 43 to the AC source 600.

We claim:

1. In an electric motor having a main winding and a start winding each connectable with an AC source of voltage, a control circuit for controlling the application of electric power to the start winding, comprising:
    main winding circuit means connecting said main winding to said AC source;
    switch means connected between said start winding and said AC source and gatable to couple current to said start winding; and
    control means for gating said switch means to cause current flow through said start winding, the phase of said current through said start winding relative to the phase of said voltage varying with motor speed, said control means including
    reference means for developing a reference signal related to the phase of the voltage from said AC source, and
    network means responsive to a predetermined change in the relative phase between said reference signal and the phase of current through said start winding for terminating the gating of said switch means.

2. The control circuit of claim 1 wherein said control means develops a monitor signal having a phase which varies with motor speed upon termination of the gating of said switch means, and cut-in means for gating said switch means to reapply power to said start winding in response to a preselected change in the relative phase between said monitor signal and said reference signal, which preselected change indicates that said motor has assumed a preselected cut-in speed.

3. The control circuit of claim 2 wherein said cut-in means is coupled to a junction between said switch means and said start winding, said junction having a voltage sum of applied voltage and voltage induced across the start winding to thereby cause said voltage sum to correspond to said monitor signal.

4. In an electric motor having a main winding and a start winding each connectable with an AC source of voltage, a control circuit for controlling the application of electric power to the start winding, comprising:
    main winding circuit means connecting said main winding to said AC source;
    thyristor means connected between said start winding and said AC source and gatable by a trigger signal to a conduction state to pass current to said start winding;
    control means for gating said thyristor means to cause current flow through said start winding, the phase of said current through said start winding relative to the phase of said voltage varying with motor speed, said control means including
    reference means for developing a reference signal related to the phase of the voltage from said AC source, and
    network means responsive to a predetermined change in the relative phase between said reference signal and the phase of current through said start winding for terminating the gating of said thyristor means, including trigger means for generating said trigger signal in response to said reference signal having a first phase angle and for terminating said trigger signal when said reference signal has a second phase angle, coupling means for coupling said network means to said thyristor means, said predetermined change in the relative phase corresponding to a current crossover through said thyristor means which occurs at a third phase angle spaced from said first and second phase angles and not located therebetween.

5. The control circuit of claim 4 wherein said trigger means comprises continuous trigger pulse generating means enabled at said first phase angle and disabled at said second phase angle.

6. The control circuit of claim 4 wherein said trigger means comprises oscillator means for generating a pulse burst comprising a plurality of pulses, the first pulse of said burst occurring at said first phase angle and the last pulse of said burst occurring at said second phase angle.

7. The control circuit of claim 4 wherein said network means includes temporary disabling means for temporarily disabling said trigger means in response to said reference signal assuming said second phase angle, including a switching device which assumes a low impedance state to shunt said trigger means in response to said reference signal reaching a magnitude corresponding to said second phase angle.

8. The control circuit of claim 7 wherein said reference means includes first electrical path means in parallel with said AC source for developing a first reference signal having a phase corresponding to said first phase angle, and second electrical path means in parallel with said AC source and having a different time constant than said first electrical path means for developing a second reference signal having a phase corresponding to said second phase angle, said first electrical path means being coupled to said trigger means to initiate generation of said trigger signal, said temporarily disabling means includes a thyristor means having power terminals exhibiting conductive and nonconductive states therebetween and coupled across said trigger means, said thyristor means further having a gate terminal for controlling the state of said thyristor means, said second electrical path means being coupled to said gate terminal to thereby effectively terminate said trigger signal.

9. The control circuit of claim 1 wherein a start capacitor is serially connected in circuit with said start winding and said switch means, and said reference means includes phase shift means for introducing a phase shift in said reference signal to compensate for the current phase shift introduced by said start capacitor.

10. The control circuit of claim 9 wherein said phase shift means comprises a capacitor.

11. In an electric motor having a main winding and a start winding each connectable with an AC source of voltage, a control circuit for controlling the application of electric power to the start winding, comprising:
main winding circuit means connecting said main winding in parallel with said AC source;
thyristor means having a pair of power terminals exhibiting conductive and nonconductive states therebetween under control of a gate terminal, said thyristor means reverting to the nonconductive state when a current between the pair of power terminals decreases below a minimum holding value;
start winding circuit means for connecting one of the power terminals directly to one side of said AC source and for connecting said start winding and the other of power terminals in series with the other side of said AC source to cause the phase of current through the thyristor means to be directly proportional to the phase of current through the start winding; and
control means for said thyristor means including electrical path means in parallel with said AC source for developing with reference to said one side of said AC source a reference signal having a phase fixed with respect to the phase of voltage from said AC source, and
network means connected with said electrical path means and said gate terminal for controlling the state of said thyristor means in response to the relative phase difference between the phase of said start winding current and the phase of said reference signal.

12. The control circuit of claim 11 wherein said electrical path means includes first branch means having a plurality of electrical elements in series across said AC source and second branch means connected between said network means and a junction between adjacent elements in said first branch means, one of said branch means including phase shift means for causing said reference signal to have a fixed phase offset with respect to the phase of voltage from said AC source.

13. In an electric motor having a main winding and a start winding each connectable with an AC source of voltage, a control circuit for controlling the application of electric power to the start winding, comprising:
main winding circuit means connecting said main winding in parallel with said AC source;
thyristor means having power terminals exhibiting conductive and nonconductive states therebetween under control of a gate terminal, said thyristor means reverting to the nonconductive state when a current between the power terminals decreases below a minimum holding value;
start winding circuit means for connecting said start winding and said power terminals in series across said AC source to cause the phase of current through the thyristor means to be directly proportional to the phase of current through the start winding; and
control means for said thyristor means including
electrical path means in parallel with said AC source for developing a reference signal having a phase fixed with respect to the phase of voltage from said AC source,
network means connected with said electrical path means and said gate terminal for controlling the state of said thyristor means in response to the relative phase difference between the phase of said start winding current and the phase of said reference signal,
said electrical path means includes first branch means having a plurality of electrical elements in series across said AC source and second branch means connected between said network means and a junction between adjacent elements in said first branch means, one of said branch means including phase shift means comprising a voltage breakdown device which conducts when the voltage thereacross exceeds a predetermined level, and said one branch means connects said voltage breakdown device in a series circuit to cause the reference signal to have a fixed phase lag with respect to the phase of voltage from said AC source.

14. In an electric motor having a main winding and a start winding each connectable with an AC source of voltage, a control circuit for controlling the application of electric power to the start winding, comprising:
main winding circuit means connecting said main winding in parallel with said AC source;
thyristor means having power terminals exhibiting conductive and nonconductive states therebetween under control of a gate terminal, said thyristor means reverting to the nonconductive state when a current between the power terminals decreases below a minimum holding value;
start winding circuit means for connecting said start winding and said power terminals in series across said AC source to cause the phase of current through the thyristor means to be directly proportional to the phase of current through the start winding; and
control means for said thyristor means including
electrical path means in parallel with said AC source for developing a reference signal having a phase fixed with respect to the phase of voltage from said AC source, network means connected with said electrical path means and said gate terminal for controlling the state of said thyristor means in response to the relative phase difference between the phase of said start winding current and the phase of said reference signal, temperature coefficient impedance means and safety means for preventing said thyristor means from being gated into said conductive state when the impedance of said temperature coefficient impedance means changes to a predetermined value which indicates a motor overload.

15. In an electric motor having a main winding and a start winding each connectable with an AC source of voltage, a control circuit for controlling the application of electric power to the start winding, comprising:

main winding circuit means connecting said main winding in parallel with said AC source;

thyristor means having power terminals exhibiting conductive and nonconductive states therebetween under control of a gate terminal, said thyristor means reverting to the nonconductive state when a current between the power terminals decreases below a minimum holding value;

start winding circuit means for connecting said start winding and said power terminals in series across said AC source to cause the phase of current through the thyristor means to be directly proportional to the phase of current through the start winding, including a junction located between said start winding and said power terminals, the voltage at said junction being unclamped when said thyristor means reverts to said nonconductive state; and control means for said thyristor means including electrical path means in parallel with said AC source for developing a reference signal having a phase fixed with respect to the phase of voltage from said AC source, and network means responsive to the relative phase difference between the phase of said start winding current and the phase of said reference signal, including a first trigger circuit connected between said electrical path means and said gate terminal for controlling the state of said thyristor means and a second trigger circuit connected between said first trigger circuit and said junction to modify control of the state of said thyristor means in response to the phase of voltage at said junction.

16. The control circuit of claim 15 wherein said second trigger circuit gates said thyristor means into said conductive state when the speed of said motor falls below a preselected cut-in speed as determined by the phase of the unclamped voltage at said junction.

17. In an electric motor having a main winding and a start winding each connectable with an AC source of voltage, a control circuit for controlling the application of electric power to the start winding, comprising:

main winding circuit means connecting said main winding to said AC source, switch means connected between said start winding and said AC source and gatable from a nonconductive state during which a sum voltage is developed to a conductive state which passes power to said start winding, reference means for developing a reference signal related to the phase of voltage from said AC source, and control means for controlling the state of said switch means in response to the relative phase between said sum voltage and said reference signal.

18. The control circuit of claim 17 including a start capacitor, series means connecting said start capacitor in a series path with said switch means and start winding to cause said sum voltage to lag current through said series path when said switch means is gated to said conductive state, said switch means includes a gate terminal for controlling the state of said switch means, and said control means includes impedance means coupled between a junction in said series path and said gate terminal for passing said sum voltage to said gate terminal.

19. The control circuit of claim 18 wherein said reference means comprises a series of electrical elements in series across said AC source, a voltage breakdown device which conducts when the voltage thereacross exceeds a predetermined level, and means connecting said voltage breakdown device between a junction in the series of electrical elements and said impedance means whereby said reference signal has a fixed phase lag with respect to the phase of voltage from said AC source.

20. The control circuit of claim 19 wherein said impedance means includes capacitor means charged by said sum voltage, and said reference means includes thyristor means in shunt with said capacitor means and having a gate terminal coupled to said voltage breakdown device to control the state of said thyristor means in response to the fixed phase lag reference signal.

21. The control circuit of claim 17 wherein said control means includes initial means for gating said switch means for at least a first time period, sampling means for disabling the gating of said switch means for a second time period substantially less than said first time period, and network means for terminating the gating of said switch means in response to a predetermined change in the relative phase between said reference signal and said sum voltage developed while said sampling means maintains said switch means in its nonconductive state.

22. The control circuit of claim 21 wherein said reference means includes phase shift means for causing the phase of said reference signal to lag by a fixed offset said voltage from said AC source, start winding circuit means connecting said switch means and said start winding in a series path, said control means includes monitor means coupled to a junction in said series path for developing said sum voltage when said switch means is disabled by said sampling means, and said network means comprises comparison means having a first input coupled to said reference means and a second input coupled to said monitor means for controlling the state of said switch means in response to the lag or lead of said reference signal with respect to said sum voltage.

23. The control circuit of claim 17 wherein said electric motor includes a sensor winding mutually coupled to said start winding to develop a sensor voltage having a phase following the phase of said sum voltage, and said control means comprises network means coupled to said reference means and said sensor winding for controlling the state of said switch means in response to the relative phase difference between said reference signal and said sensor voltage.

24. The control circuit of claim 23 wherein said reference means comprises first electrical path means in parallel with said AC source and second electrical path means coupled between said first electrical path means and said switch means for passing a trigger signal to gate said switch means to said conductive state, one of said path means including capacitor means, said network means includes thyristor means coupled across said capacitor means and thyristor trigger means coupled between said sensor winding and said thyristor means for gating the thyristor means to shunt said capacitor means in response to the phase of said sensor winding.

25. The control circuit of claim 17 wherein said control means includes initial means for maintaining said switch means gated to said conductive state until the motor speed exceeds a cut-out value, and cut-in means responsive to a predetermined relative phase between said reference signal and said sum voltage for gating said switch means to said conductive state to reapply power to said start winding.

26. In an electric motor having a main winding and a start winding each connectable with an AC source of voltage, a control circuit for controlling the application of electrical power to the start winding, comprising:

switch means having a reference side directly connected with one side of said AC source and an opposite side connected in a series circuit with said start winding and another side of said AC source, said switch means having an on state to apply power to said start winding and produce an increase in motor speed and an off state to remove power from said start winding and develop at said opposite side a voltage sum of the applied voltage and a voltage induced across the start winding, control means for maintaining the on state of said switch means until the motor speed exceeds a cut-out value, including cut-in means coupled to the series circuit and responsive to a predetermined relative phase between said applied voltage and said voltage sum for turning on said switch means to reapply power to said start winding, said relative phase between said voltages varying with motor speed and occurring with reference to said reference side of said switch means.

27. The control circuit of claim 26 wherein said switch means comprises thyristor means having power terminals connected between said start winding and said AC source and exhibiting conductive and nonconductive states therebetween under control of a gate terminal, said control means includes reference means coupled to said AC source for developing a reference signal related to the phase of voltage from said AC source, and network means coupled between said reference means and said gate terminal for terminating the gating of said switch means in response to a predetermined change in the relative phase between said reference signal and the phase of current through the start winding, said predetermined change corresponding to said cut-out valve of motor speed.

28. The motor control circuit of claim 26 wherein said switch means comprises thyristor means having power terminals exhibiting conductive and nonconductive states therebetween under control of a gate terminal, said control means includes reference means in parallel with said AC source for developing a reference signal related to the phase of voltage from said AC source, and network means coupled to said reference means and to said series circuit for terminating a trigger signal to said gate electrode in response to a predetermined change in the relative phase between said reference signal and said voltage sum.

29. The control circuit of claim 26 wherein said switch means turns on in response to a trigger signal and turns off during a current cross-over through the switch means, said control means includes trigger means responsive to the phase of the applied voltage for generating said trigger signal with reference to said reference side of said switch means, means for effectively disabling said trigger means to maintain said switch means in an off state in response to said voltage sum being developed, and said cut-in means includes means for effectively enabling said trigger means to turn on said switch means in response to the relative phase assuming said predetermined relative phase which corresponds to said cut-in value.

30. The control circuit of claim 29 wherein said trigger means includes capacitor means connected in a charging path with reference to said reference side for generating said trigger signal when said capacitor means has a predetermined charge, said effectively disabling means comprises a semiconductor switch having on and off states and coupled in shunt with said capacitor means to disable said trigger means in response to said semiconductor switch being turned on and to enable said trigger means in response to said semiconductor switch being turned off, said effectively enabling means includes means for turning off said semiconductor switch in response to said relative phase assuming said cut-in value.

31. In an electric motor having a main winding and a start winding each connectable with an AC source of voltage, a control circuit for controlling the application of electric power to the start winding, comprising:

switch means connected between said start winding and said AC source and gatable to apply power to said start winding, control means for repetitively gating said switch means while said motor is below a cut-out speed to pass selected phase angles, sampling means for periodically disabling the gating of said switch means during said selected phase angles, including monitor means effective while said switch means is disabled by said sampling means for developing a signal representative of the speed of said motor, and said control means includes termination means coupled to said monitor means for terminating the gating of said switch means when said signal indicates the motor has exceeded said cut-out speed.

32. The control circuit of claim 31 wherein said sampling means includes means effective only after a plurality of cycles of voltage have been gated for disabling said switch means for a sampling interval substantially less than the interval of the gated plurality of cycles of voltage.

33. The control circuit of claim 31 wherein said control means includes start winding circuit means for connecting said start winding and said switch means in series across said AC source, reference means in parallel with said AC source for developing a reference signal related to the phase of voltage from said AC source, said monitor means being connected to a junction in said start winding circuit means for developing a voltage sum signal corresponding to the sum of applied voltage and voltage induced in said start winding, said termination means being responsive to a predetermined change in the relative phase between said reference signal and said voltage sum signal for terminating the gating of said switch means.

34. In an electric motor having a main winding and a start winding each connectable with an AC source of voltage, a control circuit for controlling the application of electric power to the start winding, comprising:
thyristor means having first and second power terminals with a conductive state therebetween under control of a gate signal between a gate terminal and said second power terminal;
winding circuit means connecting said AC source to said main winding and to said start winding through said power terminals including a common line directly connecting said second power terminal to one side of said AC source,
first rectification means for rectifying a first alternating signal to develop with respect to said common line a first DC signal having a scalar magnitude proportional to a first characteristic,
second rectification means for rectifying a second alternating signal different than said first alternating signal to develop with respect to said common line a second DC signal having a scalar magnitude proportional to a second characteristic, and
scalar means coupled between said gate terminal and said first rectification means and said second rectification means for effectively generating said gate signal between said gate terminal and said one side of said AC source in response to an arithmetic sum or difference of the scalar magnitudes of said first and second DC signals.

35. The control circuit of claim 34 wherein said first rectification means is coupled across said AC source to develop a first DC voltage corresponding to the voltage of said AC source.

36. The control circuit of claim 35 wherein said winding circuit means develops at a junction an alternating voltage proportional to a speed varying voltage induced in the start winding and to the absolute magnitude of the voltage of said AC source, said second rectification means includes diode means coupled between said junction and said scalar means for rectifying the alternating voltage to develop a second DC voltage proportional to the scalar magnitude thereof, and said scalar means being responsive to the arithmetic difference of the scalar magnitudes of said first and second DC voltages.

37. The control circuit of claim 35 wherein said winding circuit means includes a start capacitor, series means including said common line for connecting said start winding, said start capacitor, and said power terminals in series across said AC source, said second rectification means includes diode means coupled between said series means and said scalar means for rectifying a voltage across said start capacitor to develop a second DC voltage, and said scalar means being responsive to the arithmetic difference of the scalar magnitudes of said first and second DC voltages.

38. The control circuit of claim 40 wherein said first rectification means includes first diode means coupled to first filtering capacitor means for developing across said first filtering capacitor means a first DC voltage corresponding to said first DC signal, said second rectification means includes second diode means coupled to second filtering capacitor means for developing across said second filtering capacitor means a second DC voltage corresponding to said second DC signal, said first and second impedance means being respectively coupled to said first and second filtering capacitor means to cause the scalar filtering capacitor means to be responsive to the voltage difference of the DC voltages across said first and second filtering capacitor means.

39. The control circuit of claim 34 wherein said winding circuit means includes resistor means serially coupling the start winding with the AC source, said start winding having a resistance distributed therethrough, which is large with respect to the resistor means, and said second rectification means includes a filtering capacitor means connected to a junction in the first rectification means which is at a potential different than the voltage from said AC source.

40. In an electric motor having a main winding and a start winding each connectable with an AC source of voltage, a control circuit for controlling the application of electric power to the start winding, comprising:
switch means actuable to pass power;
winding circuit means connecting to said AC source said main winding and said start winding through said switch means, including
first rectification means for rectifying a first alternating signal to develop a first DC signal having a scalar magnitude proportional to a first characteristic,
second rectification means for rectifying a second alternating signal different than said first alternating signal to develop a second DC signal having a scalar magnitude proportional to a second characteristic, and
scalar means for controlling actuation of said switch means in response to an arithmetic sum or difference of the scalar magnitudes of said first and second DC signals, including scalar filtering capacitor means, first impedance means coupling said first rectification means to said scalar filtering capacitor means, and second impedance means coupling said second rectification means to said scalar filtering capacitor means.

41. The control circuit of claim 38 wherein said first and second diode means are oppositely poled to charge said first and second filtering capacitor means to opposite polarities, and each of said impedance means comprise resistive means whereby said polarities are subtracted at said scalar filtering capacitor means.

42. The control circuit of claim 40 wherein said switch means comprises thyristor means having power terminals exhibiting conductive and nonconductive states therebetween under control of a gate terminal, series means connecting said start winding and said power terminals in series across said AC source to cause the phase of current through the thyristor means to be directly proportional to the phase of current through the start winding, and said scalar means includes a voltage breakdown device which conducts when the voltage thereacross exceeds a predetermined level and means connecting said voltage breakdown device in series between said gate terminal and said scalar filtering capacitor means.

43. The control circuit of claim 42 wherein said scalar means includes third diode means coupled between said series means and said second rectification means and poled to gate said thyristor means to said conductive state when the speed of said motor falls below a predetermined cut-in speed.

44. In an electric motor having a main winding and a start winding each connectable with an AC source of voltage, a control circuit for controlling the application of electric power to the start winding, comprising:
   switch means actuable to pass power;
   winding circuit means connecting to said AC source said main winding and said start winding through said switch means, including a start capacitor, and series means connecting said start capacitor in series with said start winding and said switch means,
   first diode means coupled to first filtering capacitor means for developing across said first filtering capacitor means a first DC voltage having a scalar magnitude proportional to a first alternating signal, said first diode means being connected to one side of said start capacitor,
   second diode means coupled to second filtering capacitor means for developing across said second filtering capacitor means a second DC voltage having a scalar magnitude proportional to a second alternating signal different than said first alternating signal, said second diode means being connected to the opposite side of said start capacitor, and
   scalar means coupled to said first capacitor means and said second capacitor means for controlling actuation of said switch means in response to an arithmetic sum or difference of the scalar magnitudes of said first and second DC voltages.

45. The control circuit of claim 44 wherein said winding circuit means includes resistor means shunting said sides of said start capacitor to which said first and second diode means are connected in said series means.

* * * * *